US009900489B2

(12) United States Patent
Lee et al.

(10) Patent No.: US 9,900,489 B2
(45) Date of Patent: Feb. 20, 2018

(54) SYSTEM AND METHOD OF PROVIDING DEVICE USE INFORMATION

(71) Applicant: SAMSUNG ELECTRONICS CO., LTD., Suwon-si (KR)

(72) Inventors: Hye-won Lee, Seoul (KR); Yong-ho Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 14/592,572

(22) Filed: Jan. 8, 2015

(65) Prior Publication Data
US 2015/0195444 A1    Jul. 9, 2015

(30) Foreign Application Priority Data
Jan. 9, 2014  (KR) .................. 10-2014-0003088

(51) Int. Cl.
H04N 5/232  (2006.01)
H04L 29/08  (2006.01)
H04W 4/20  (2018.01)

(52) U.S. Cl.
CPC ......... *H04N 5/23203* (2013.01); *H04L 67/22* (2013.01); *H04N 5/23293* (2013.01); *H04W 4/20* (2013.01)

(58) Field of Classification Search
CPC ............ H04N 5/23203; H04N 5/23293; H04L 67/22; H04W 4/20
See application file for complete search history.

(56) References Cited

U.S. PATENT DOCUMENTS

| 8,102,425 | B2 * | 1/2012 | Hirose | H04N 1/00236 |
| | | | | 348/207.1 |
| 8,523,667 | B2 * | 9/2013 | Clavin | G06K 9/00369 |
| | | | | 345/18 |
| 2007/0081090 | A1 * | 4/2007 | Singh | G11B 27/034 |
| | | | | 348/333.11 |
| 2010/0112986 | A1 | 5/2010 | Ellingham et al. | |
| 2010/0254609 | A1 * | 10/2010 | Chen | G06K 9/00221 |
| | | | | 382/195 |
| 2011/0082735 | A1 * | 4/2011 | Kannan | G06F 17/30247 |
| | | | | 705/14.23 |
| 2011/0237324 | A1 | 9/2011 | Glavin et al. | |
| 2012/0054789 | A1 | 3/2012 | Evans et al. | |

(Continued)

FOREIGN PATENT DOCUMENTS

| GB | 2412805 A | 10/2005 |
| KR | 10-0904201 B1 | 6/2009 |
| KR | 10-1092295 B1 | 12/2011 |

OTHER PUBLICATIONS

Communication dated May 15, 2015, issued by the European Patent Office in counterpart European Patent Application No. 15150534.4.

*Primary Examiner* — Luong T Nguyen
(74) *Attorney, Agent, or Firm* — Sughrue Mion, PLLC

(57) ABSTRACT

A system and method for providing device use information are provided. The method may be performed by a device and may include capturing an image of a user of the device, capturing an image of a screen of the device that corresponds to the captured image of the user, generating device use information based on the image of the user and the image of the screen image, and transmitting the device use information to another device.

25 Claims, 21 Drawing Sheets

(56) References Cited

U.S. PATENT DOCUMENTS

2012/0191770 A1   7/2012  Perlmutter et al.
2014/0181910 A1*  6/2014  Fingal .................. H04L 63/107
                                                                 726/4
2015/0179141 A1*  6/2015  Dabhi ..................... G09G 5/06
                                                                 345/594

* cited by examiner

SYSTEM AND METHOD OF PROVIDING DEVICE USE INFORMATION

CROSS-REFERENCE TO RELATED APPLICATION(S)

This application claims priority from Korean Patent Application No. 10-2014-0003088, filed on Jan. 9, 2014, in the Korean Intellectual Property Office, the disclosure of which is incorporated herein in its entirety by reference.

BACKGROUND

1. Field

Apparatuses and methods consistent with exemplary embodiments relate to a system and method of providing device use information including a captured user image and a captured screen image.

2. Description of Related Art

Due to recent developments in multimedia technology and network technology, a user may be provided with various services y using various types of devices. Also, recently, the amount of time in which children use portable terminals has increased, and thus, it may be desirable for parents to actively control how and what features of a device are used by their children.

However, in the related art portable terminal control devices, parents may control devices used by their children in a one-way and forced manner so as to prevent their children from using the device or features of the device for a long period of time to protect their children against harmful contents.

Therefore, there is a demand for a enabling a user of a control device to effectively and affirmatively control a device use of a user of another device (i.e. a controlled device) by exchanging various types of information between the control device and the controlled device.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a system and method of providing device use information, which enable a user of another device to recognize a device use status of a user of a device by providing the device use information. For example, the device use information may include a captured user image and a captured screen image of the device.

According to an aspect of an exemplary embodiment, there is provided a method of a device for providing device use information, the method including capturing an image of a user of the device; capturing an image of a screen of the device which corresponds to the captured image of the user; generating the device use information based on the image of the user and the image of the screen that corresponds to the image of the user; and transmitting the device use information to another device.

The method may further include an operation of determining, based on the captured image of the user, an object on the screen at which eyes of the user are pointed, and the generating the device use information may include emphasizing the determined object on the screen image.

The capturing the image of the screen may include capturing at least one of an execution screen of an application that is being executed by the device, and a reproduction screen of content that is being reproduced by the device.

A condition to generate the device use information may be set by the first device, and the device use information may be generated in response to the condition set by the other device being satisfied.

The method may further include determining a status of the user based on the image of the user, and whether to generate the device use information may be determined according to a result of the determined status of the user.

The determining the status of the user may include an operation of determining a facial expression of the user.

The determining the status may include determining whether a shape of the user in the user image is different from a reference shape by a value that is equal to or greater than a preset value, based on a status of the device which is sensed by a sensor of the device and based on the user image.

The operation of generating the device use information may include an operation of generating real-time use status information about the device and use log information about the device.

The generating the device use information may include generating use statistics information about the device.

The generating the use statistics information may include adding expert comment information for educating the user of the device to the use statistics information.

The method may further include receiving, from the other device, a stepwise ending recommendation request for an application or content, the request including the number of times that ending recommendation is performed; and in response to the stepwise ending recommendation request, sequentially displaying a plurality of ending recommendation messages according to the number of times that the ending recommendation is performed and according to whether the application or content being executed by the device is ended by the user of the device.

According to an aspect of another exemplary embodiment, there is provided a device configured to provide device use information, the device including a controller configured to capture an image of a user of the device, and an image of a screen of the second device, and generate device use information based on the image of the user and the image of the screen image that corresponds to the image of the user; and a communicator configured to transmit the device use information to another device.

The controller may determine, based on the image of the user, an object on the screen of the device at which eyes of the user are pointed, and may emphasize the determined object on the screen.

The controller may capture at least one of an execution screen of an application that is executed by the device, and a reproduction screen of content that is reproduced by the device.

A condition to generate the device use information may be set by the other device, and in response to the condition set by the other device being satisfied, the controller may generate the device use information.

The controller may determine a status of the user based on the image of the user, and may determine whether to generate the device use information according to a result of the determined status of the user.

The controller may determine a facial expression of the user.

The controller may determine whether a shape of the user in the image of the user is different from a reference shape by a value that is equal to or greater than a preset value, based on a status of the device which is sensed by a sensor of the device and based on the user image.

The controller may generate real-time use status information about the device and use log information about the device.

The controller may generate use statistics information about the device.

The controller may add expert comment information for educating the user of the device to the use statistics information.

The communicator may receive, from the other device, a stepwise ending recommendation request for an application or content, the request including the number of times that ending recommendation is performed, and in response to the stepwise ending recommendation request, the controller may sequentially display a plurality of ending recommendation messages according to the number of times that the ending recommendation is performed and according to whether the application or content executed by the device is ended by the user of the device.

According to another aspect of an exemplary embodiment, there is provided, there is provided a method of a first device for receiving device use information from a second device, the method including setting, by the first device, a condition for the second device to generate device use information; transmitting, by the first device, condition information based on the set condition, to the second device; and receiving, at the first device from the second device, device use information about the second device which is generated based on the transmitted condition information, wherein the device use information includes an image of a user captured by the second device, and an image of a screen image which corresponds to the image of the user and is captured by the second device.

According to an aspect of another exemplary embodiment, there is provided a non-transitory computer-readable recording medium having recorded thereon at least one program including commands for executing the method of providing device use information.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
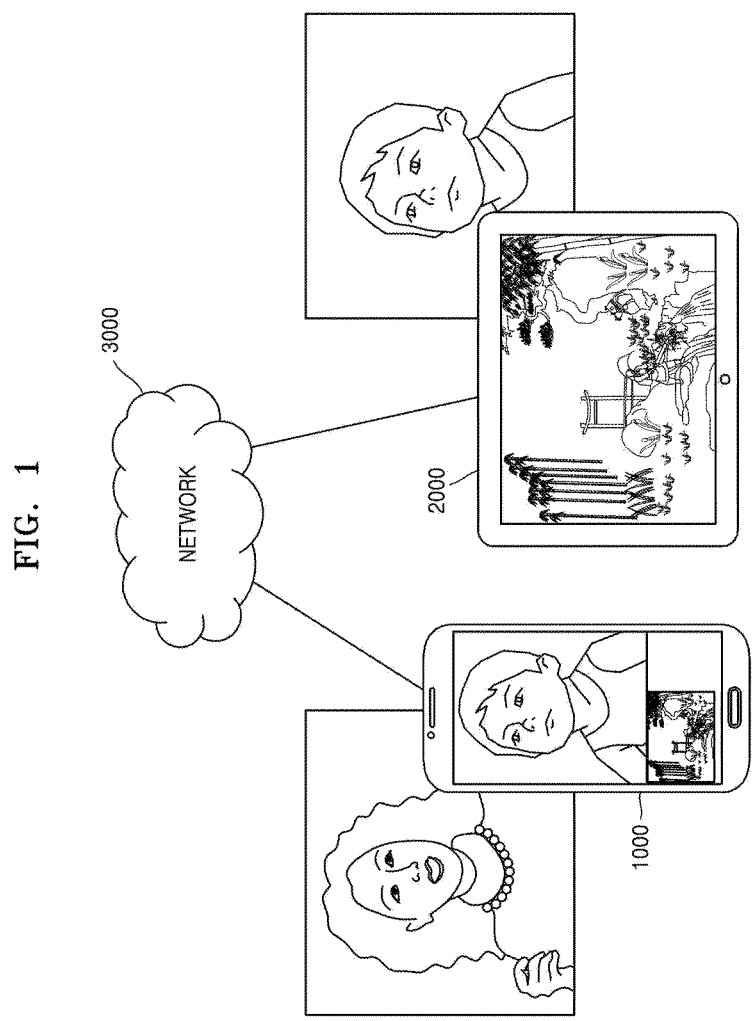
FIG. 1 illustrates a system for providing device use information according to an exemplary embodiment.

Hereinafter, the exemplary embodiments of the present invention are described with reference to the accompanying drawings. However, one or more of the exemplary embodiments may be embodied in many different forms and should not be construed as being limited to the exemplary embodiments set forth herein; rather, these exemplary embodiments are provided so that this disclosure will be thorough and complete, and will fully convey the concept of the embodiments of the present invention to those of ordinary skill in the art. In the following description, well-known functions or constructions will not be described in detail so as not to obscure one or more of the exemplary embodiments with unnecessary detail. Also, throughout the specification, like reference numerals in the drawings denote like elements.

Throughout the specification, it will also be understood that when an element is referred to as being "connected to" another element, it may be directly connected to the other element, or electrically connected to the other element while intervening elements may also be present.

Throughout the specification, the term "device use information" indicates information about the use of a device. As a non-limiting example, the device use information may include information about a status of the device use, and information about a status of a user who uses a device. Also, the information about the status of the device use may include real-time use status information about the device, use log information about the device, use statistics information about the device, and the like.

Throughout the specification, the term "device monitoring application" indicates an application for monitoring a second device 2000 and the application may be installed in each of a first device 1000 and the second device 2000. The device monitoring application that is installed in the first device 1000 may output device use information received from the second device 2000, and may transmit control information to the second device 2000. Also, the device monitoring application that is installed in the second device 2000 may generate the device use information about the second device 2000, may provide the device use information to the first device 1000, and may control the second device 2000 according to the control information received from the first device 1000.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a system for providing device use information according to an exemplary embodiment.

Referring to FIG. 1, the system for providing device use information includes a first device 1000, a second device 2000, and a network 3000. The first device 1000 may be a device of a parent, and the second device 2000 may be a device of a child, but one or more embodiments of the present invention are not limited thereto.

The first device 1000 may monitor a status of the second device 2000 and a status of a user of the second device 2000, and may provide control information to the second device 2000 so as to control an operation of the second device 2000. To do so, the first device 1000 may receive, from the second device 2000, device use information that is generated when the user of the second device 2000 uses the second device 2000, and may provide the control information to the second device 2000, based on the received device use information.

Also, the second device 2000 may sense occurrence of an event, may generate the device use information about a use status of the second device 2000 and the device use information about the status of the user of the second device 2000, and may provide the generated device use information to the first device 1000.

Also, the first device 1000 may display the device use information received from the second device 2000, and may transmit the control information to the second device 2000, according to a user input.

The first device 1000 may include, but is not limited to, a smart phone, a tablet personal computer (PC), a PC, a smart TV, a mobile phone, a personal digital assistant (PDA), a laptop computer, a media player, a micro server, a global positioning system (GPS) apparatus, an electronic book terminal, a terminal for digital broadcasting, a navigation device, a kiosk, an MP3 player, a digital camera, and other mobile or non-mobile computing devices.

The second device 2000 may include, but is not limited to, a smart phone, a tablet PC, a PC, a smart TV, a mobile phone, a PDA, a laptop computer, a media player, a GPS apparatus, an electronic book terminal, a terminal for digital broadcasting, an MP3 player, a digital camera, and other mobile or non-mobile computing devices.

The network 3000 includes a Local Area Network (LAN), a Wide Area Network (WAN), a Value Added Network (VAN), a mobile radio communication network, a satellite communication network, or a combination of theses. The network 3000 collectively indicates data communication networks that allow network configuring elements shown in FIG. 1 to communicate without a problem, and includes wired Internet, wireless internet, and a mobile wireless communication network.

Figure 2:
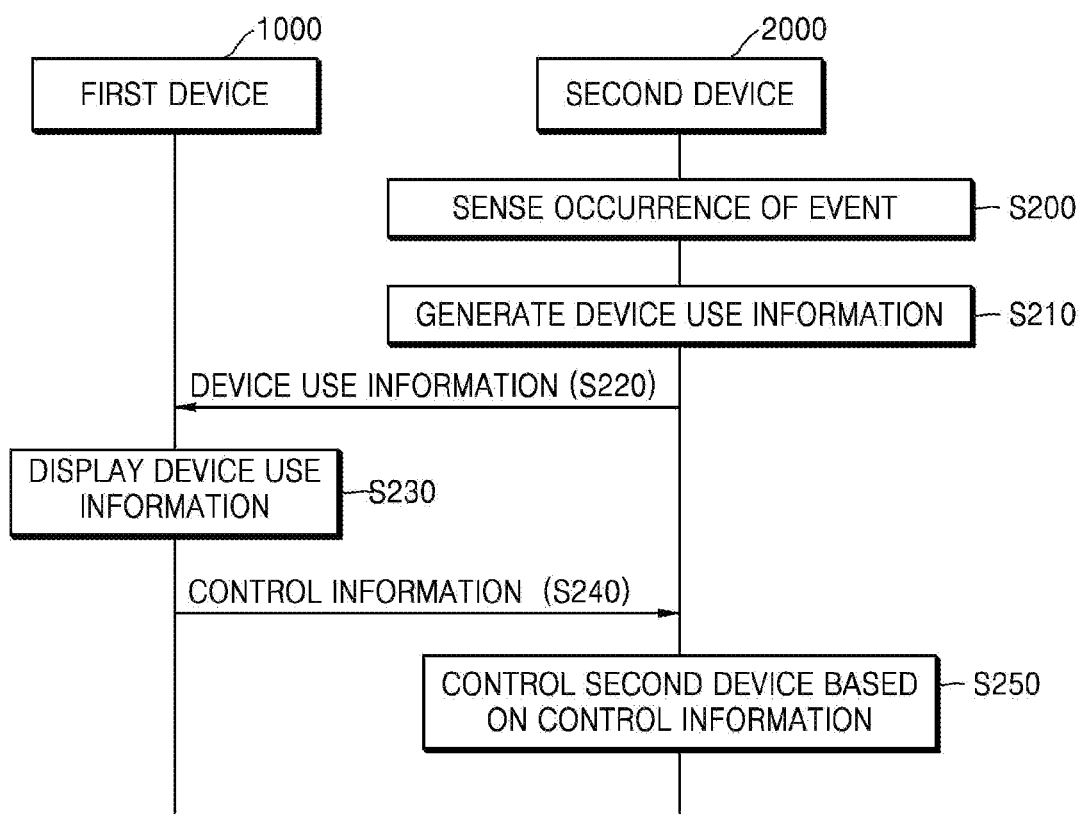
FIG. 2 is a flowchart of a method of receiving device use information from a second device and providing control information to the second device in the system for the providing device use information, the method performed by a first device, according to an exemplary embodiment.

FIG. 1 illustrates a system for providing device use information according to an exemplary embodiment FIG. 2 is a flowchart of a method of receiving device use information from the second device 2000 and providing control information to the second device 2000 in the system for the providing device use information, the method performed by the first device 1000, according to an exemplary embodiment.

Referring to FIGS. 1 and 2, in operation S200, the second device 2000 senses an occurrence of an event. The second device 2000 may sense whether a preset event occurs. For example, the second device 2000 may sense whether power of the second device 2000 is turned ON or OFF, whether a predetermined application is being executed or has ended, predetermined content is being executed or has ended, and the like. The second device 2000 may also sense a status of a user of the second device 2000 and may analyze a posture of the user. The second device 2000 may also determine whether a current time approaches a use time limit. Also, types of events that are to be sensed by the second device 2000 may be preset by the first device 1000. For example, the first device 1000 may set a type of event to be sensed by the second device 2000, according to a user input that is input via a device monitoring application executed by the first device 1000. Also, setting information set by the first device 1000 may be provided from the first device 1000 to the second device 2000.

In operation S210, the second device 2000 generates the device use information. For example, the second device 2000 may generate information about a use status of the second device 2000, and information about the status of the user of the second device 2000. The information about the use status of the second device 2000 may include real-time use status information about the second device 2000, use log information about the second device 2000, use statistics information about the second device 2000, and the like.

For example, the device use information may include at least one of an image, a sound, and a text, and may be generated in a format that may be output via the device monitoring application installed in the first device 1000.

In operation S220, the second device 2000 provides the device use information to the first device 1000. For example, the second device 2000 may transmit the device use information to the first device 1000 via the network 3000. However, one or more exemplary embodiments are not limited thereto. For example, the second device 2000 may store the device use information in a server (not shown), and the first device 1000 may use the device use information stored in the server.

In operation S230, the first device 1000 displays the device use information. In this example, the device use information may be pushed to the first device 1000 and may be displayed on a screen of the first device 1000. Also, the device use information may be displayed on the screen of the first device 1000, according to a user input that is input through the first device 1000.

In operation S240, the first device 1000 transmits control information to the second device 2000. The first device 1000 may transmit the control information to the second device 2000, according to a user input that is based on the device use information. For example, the first device 1000 may provide, to the second device 2000, control information for applying a sticker to content that is generated by the second device 2000, control information for stepwise ending an application or content that is executed by the second device 2000, control information for controlling a message to be output to the second device 2000, and the like. As a non-limiting example, the message may ask the user of the second device 2000 to change a user's posture. However, examples of the control information are not limited thereto.

In operation S250, the second device 2000 controls the second device 2000, based on the control information. For example, the second device 2000 may interpret the control information received from the first device 1000, and may control the second device 2000, based on the control information.

Figure 3:
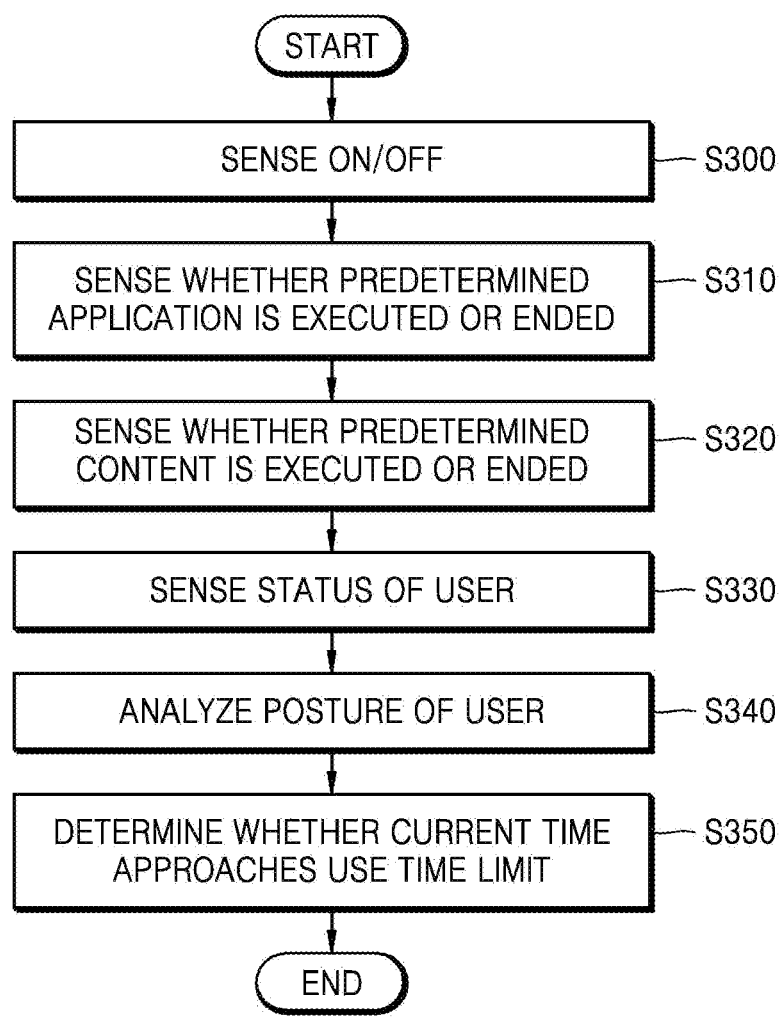
FIG. 3 is a flowchart of a method of sensing an occurrence of an event, the method performed by the second device, according to an exemplary embodiment.

FIG. 3 is a flowchart of a method of sensing an occurrence of an event, the method performed by the second device 2000, according to an exemplary embodiment.

Referring to FIG. 3, in operation S300, the second device 2000 senses whether a power of the second device 2000 is turned on or off. The second device 2000 may receive a user input for turning off the power of the second device 2000, and may determine whether the power of the second device 2000 is turned off, based on the user input. Before the power of the second device 2000 is turned off, the second device 2000 may generate device use information used to notify that the power of the second device 2000 is to be turned off, and may transmit the device use information to the first device 1000.

In operation S310, the second device 2000 senses whether a predetermined application is being executed or ended by the second device 2000. For example, the predetermined application may be previously set by the first device 1000, and the second device 2000 may receive information about the predetermined application that was set by the first device 1000, from the first device 1000. Also, because the predetermined application is being executed or ended, the second device 2000 may generate device use information so as to notify the predetermined application is being executed or has ended. For example, as described herein, when an application is ended, or has ended, it could mean that the application was previously being executed and is no longer executing, or it could refer to an example in which the application has not been executed.

In operation S320, the second device 2000 senses whether predetermined content is being executed or has ended by the second device 2000. The predetermined content may be previously set by the first device 1000, and the second device 2000 may receive information about the predetermined content that was set by the first device 1000, from the first device 1000. Also, because the predetermined content is being executed or has ended, the second device 2000 may generate device use information so as to notify the predetermined content is being executed or has ended.

In operation S330, the second device 2000 senses a status of a user of the second device 2000. For example, the second device 2000 may capture an image of the user of the second device 2000 using a camera included in the second device 2000, and may determine a facial expression of the user, based on the captured user image. For example, the second device 2000 may determine whether the user of the second device 2000 is smiling. If it is determined that the user of the second device 2000 is smiling, the second device 2000 may generate device use information indicating that the user of the second device 2000 is smiling. In this example, the second device 2000 may also determine which object among objects displayed on a screen of the second device 2000 the eyes of the smiling user are pointed at. Also, the second device 2000 may generate device use information indicating that an image of the user is captured, the predetermined application that is being executed by the second device 2000, the predetermined content that is being executed by the second device 2000, and the object at which the eyes of the user of the second device 2000 are pointed at.

In operation S340, the second device 2000 analyzes a posture of the user of the second device 2000. For example, the second device 2000 may analyze the posture of the user of the second device 2000, based on the image of the user captured using the camera of the second device 2000, and the status of the second device 2000 which may be determined using a sensor of the second device 2000. For example, the second device 2000 may determine whether the second device 2000 is slanted, using the sensor (e.g., a motion sensor, a gravity sensor, and the like) of the second device 2000, and thus, may determine the status of the second device 2000. Also, the second device 2000 may determine whether the user of the second device 20 has maintained a poor posture for a preset time period. In this example, if a shape of the user in the captured user image is different from a reference shape, for example, by a value that is equal to or greater than a preset value, the second device 2000 may determine that the posture of the user is poor. Also, the second device 2000 may generate device use information to notify of the poor posture of the user.

In operation S350, the second device 2000 determines whether a current time approaches a use time limit. For example, a use time limit may be previously set by the first device 1000, and the second device 2000 may receive information about the use time limit set by the first device 1000, from the first device 1000. When the second device 2000 determines that the current time approaches the use time limit, the second device 2000 may generate device use information indicating that the current time approaches the use time limit.

Figure 4:
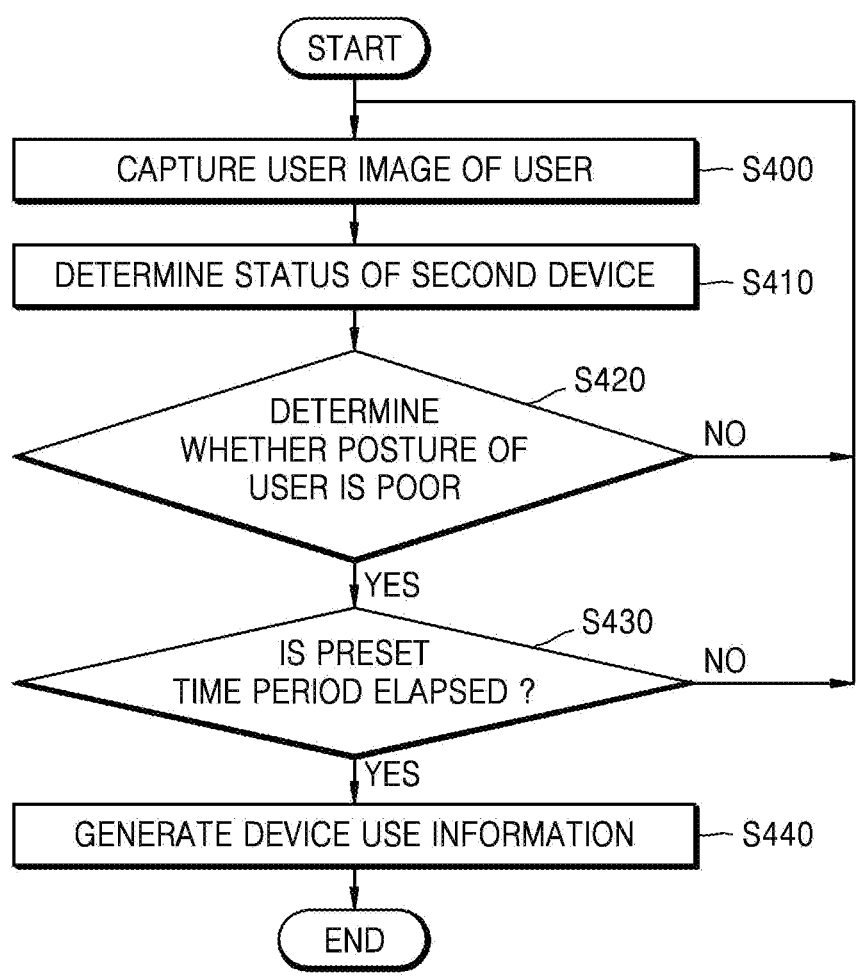
FIG. 4 is a flowchart of a method of determining whether a posture of a user is poor, the method performed by the second device, according to an exemplary embodiment.

FIG. 4 is a flowchart of a method of determining whether a posture of a user is poor, the method performed by the second device 2000, according to an exemplary embodiment.

Referring to FIG. 4, in operation S400, the second device 2000 captures a user image of a user of the second device 2000. For example, the second device 2000 may capture an image of a face or another body part of the user using a camera included in or connected to the second device 2000.

In operation S410, the second device 2000 determines a status of the second device 2000. For example, the second device 2000 may determine whether the second device 2000 is disposed or placed on a floor, is lifted up from the floor, is slanted, and the like, using a motion sensor or a gravity sensor in the second device 2000. Also, the second device 2000 may determine a location and slope of the second device 2000 with respect to a reference level.

In operation S420, the second device 2000 determines whether a posture of the user of the second device 2000 is poor. For example, the second device 2000 may determine whether the posture of the user is poor based on the captured user image and the status of the second device 2000. The second device 2000 may compare a shape or profile of the user in the captured user image with a preset reference shape or profile, and if the shape of the user is different from the reference shape by a value that is equal to or greater than a preset value, the second device 2000 may determine that the posture of the user is poor. In this example, one or more reference shapes may be differently set according to statuses of the second device 2000, respectively.

If in operation S420, the posture of the user of the second device 2000 is determined to be poor, in operation S430, the second device 2000 determines whether a length of time in which the user exhibits the poor posture elapses or is greater than a time period. For example, the first device 1000 may previously set the time period, and may provide information about the set time period to the second device 2000.

If in operation S430, the second device 2000 determines that the time period in which the posture of the user has been poor has exceeded the time period, the second device 2000 may generate device use information so as to notify that the posture of the user is poor. On the other hand, if the timer period has not been exceeded, the method returns to operation S400.

Figure 5B:
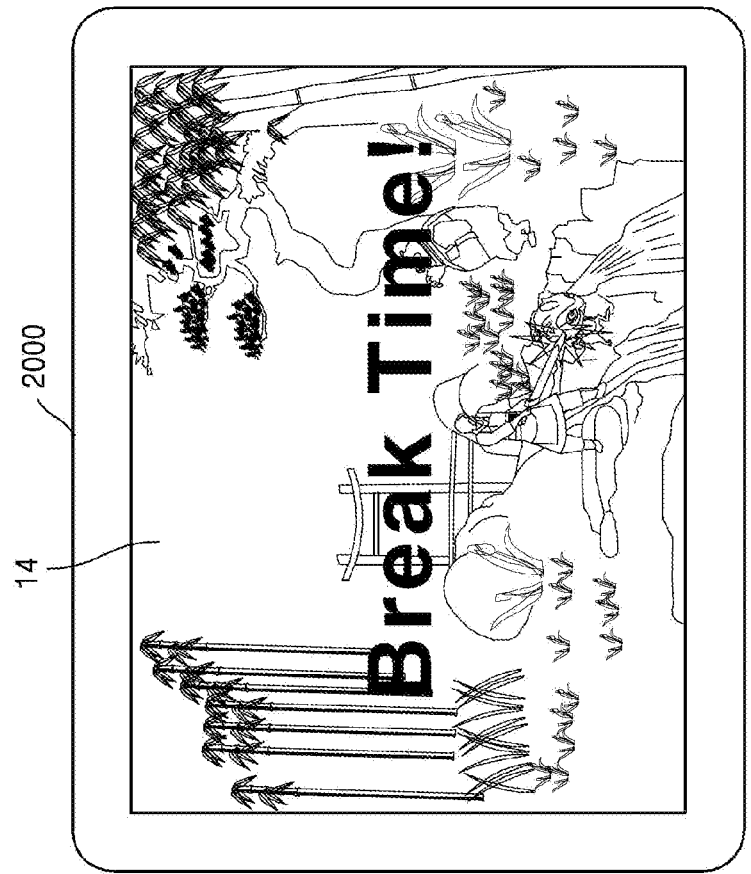
FIGS. 5A-5B illustrates an example in which device use information about a posture of a user of the second device is displayed on a screen of the first device, and the second device operates in response to a control request by the first device, according to exemplary embodiments.
Figure 5A:
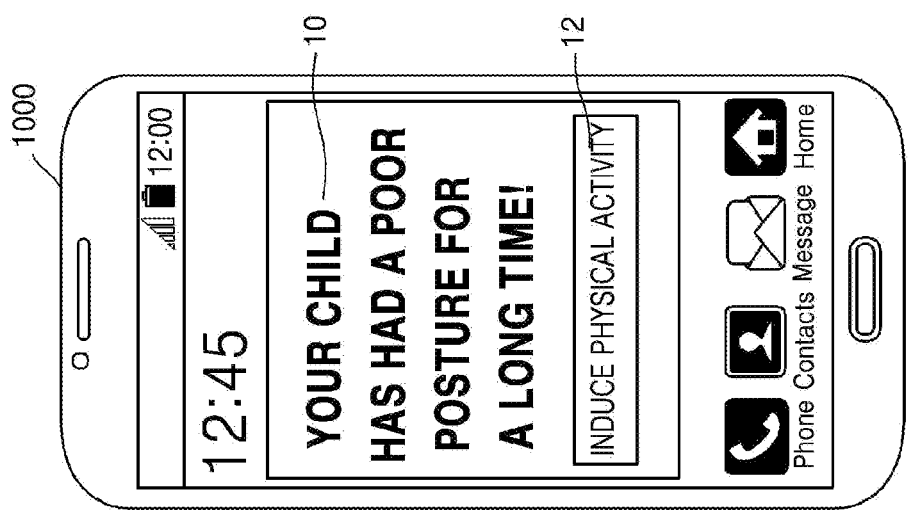

FIGS. 5A and 5B illustrate examples in which device use information about a posture of a user of the second device 2000 is displayed on a screen of the first device 1000, and the second device 2000 operates in response to a control request by the first device 1000, according to exemplary embodiments.

Referring to FIG. 5A, when a poor posture of the user of the second device 2000 is maintained for a preset period of time, the first device 1000 may receive device use information about the poor posture of the user from the second device 2000. For example, the first device 1000 may receive a message 10 saying "your child has had a poor posture for a long time" from the second device 2000, and may display the message 10 on the screen of the first device 1000. In this example, the message 10 may be pushed from the second device 2000 to the first device 1000.

Also, a user of the first device 1000 may check the message 10 and then may touch a button 12 to control the second device 2000 to perform an operation of inducing a physical activity of the user of the second device 2000. Accordingly, the first device 1000 may generate control information requesting the second device 2000 to perform the operation for inducing physical activity of the user of the second device 2000, and may transmit the control information to the second device 2000.

Afterward, as illustrated in FIG. 5B, the second device 2000 may stop reproducing the executed content. Also, in order to induce the physical activity of the user, the second device 2000 may display a message 14 notifying of a break time on a screen of the second device 2000.

Figure 6:
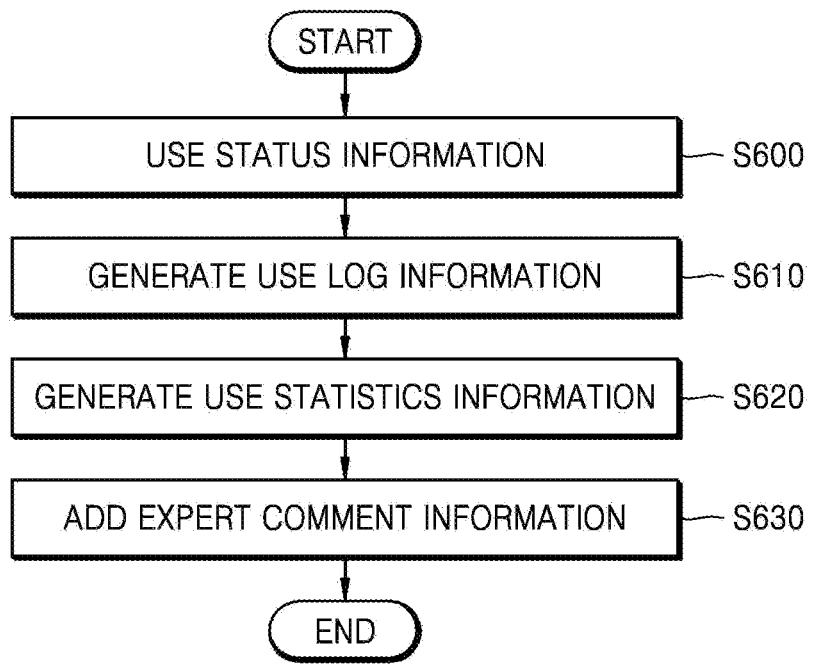
FIG. 6 is a flowchart of a method of generating device use information, the method performed by the second device, according to an exemplary embodiment.

FIG. 6 is a flowchart of a method of generating device use information, the method performed by the second device 2000, according to an exemplary embodiment.

Referring to FIG. 6, in operation S600, the second device 2000 generates use status information about the second device 2000. For example, the second device 2000 may generate, in real-time, the use status information indicating a use status of the second device 2000. The second device 2000 may capture a user image of a user of the second device 2000, may capture a screen image of a screen of the second device 2000, and may generate the use status information by combining the user image and the screen image. For example, when the user of the second device 2000 views content via the second device 2000, the second device 2000 may capture an image of a face of the user, and may also capture or otherwise store an image of the content on the screen that is being reproduced by the second device 2000. The captured user image and the captured screen image may be still images, video images, and the like, but a type of the captured image is not limited thereto. In some examples, the second device 2000 may encode the captured user image and the captured screen image into a moving picture.

When a predetermined event occurs, the second device 2000 may generate use status information. For example, when the second device 2000 determines that the user of the second device 2000 is smiling, the second device 2000 may capture an image of a face of the user of the second device 2000, and may capture a content screen of the content which is displayed when the user smiles. Also, for example, when the second device 2000 receives a request regarding real-time use status information from the first device 1000, or when a current time approaches a use time limit, the second device 2000 may encode a moving picture indicating the user of the second device 2000 and the content that is reproduced by the second device 2000. However, one or more exemplary embodiments are not limited thereto.

In operation S610, the second device 2000 generates use log information. For example, the second device 2000 may generate the use log information by accumulating and storing a plurality of pieces of use status information that are generated in operation S600. However, a method of generating the use log information is not limited thereto.

In addition, the second device 2000 may generate the use log information by accumulating and storing a plurality of pieces of information about a text indicating how the user of the second device 2000 has used the second device 2000, the captured user image of the user who uses the second device 2000, an application that is executed by the second device 2000, content that is reproduced by the second device 2000, a date and time of using the content, and the like.

In operation S620, the second device 2000 generates use statistics information about the second device 2000. For example, the second device 2000 may analyze the use log information and may generate the use statistics information. The use statistics information may include information about an entire use time of the second device 2000, a use time per each application, a use time according to categories of a plurality of pieces of content reproduced by the second device 2000, a use pattern of the second device 2000, a list of content generated by the second device 2000, and the like.

In operation S630, the second device 2000 adds expert comment information to the use statistics information. For example, the second device 2000 may generate the expert comment information based on the use pattern of the second device 2000, the content reproduced by the second device 2000, and the content generated by the second device 2000, and may add the expert comment information to the use statistics information. For example, the expert comment information may include a comment that may be for educating the user of the second device 2000.

Figure 7:
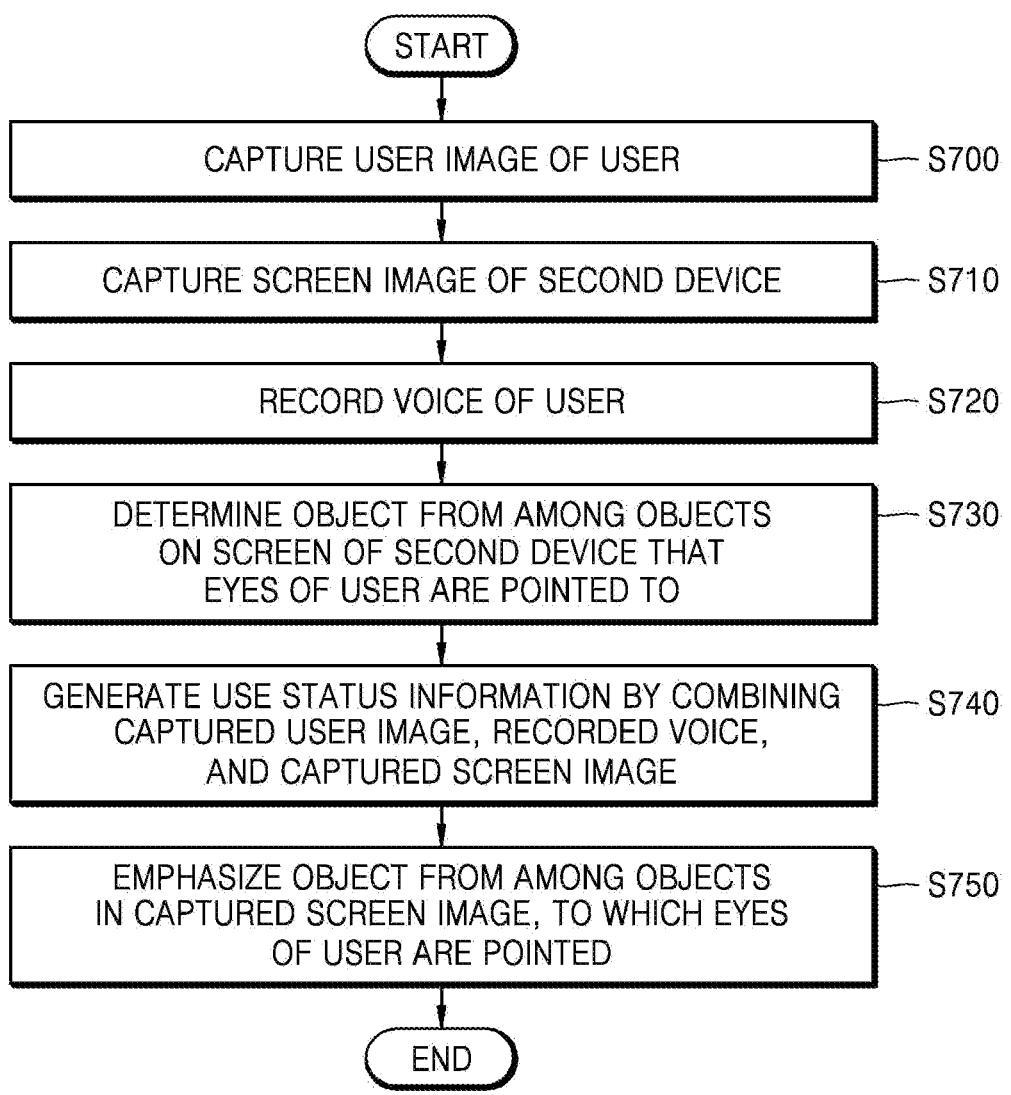
FIG. 7 is a flowchart of a method of generating use status information, the method performed by the second device, according to an exemplary embodiment.

FIG. 7 is a flowchart of a method of generating use status information, the method performed by the second device 2000, according to an exemplary embodiment.

Referring to FIG. 7, in operation S700, the second device 2000 captures an image of a user of the second device 2000. For example, the second device 2000 may capture the image of a face and/or another body part of the user by using a camera included in the second device 2000. The second device 2000 may generate a still image or a moving picture image by capturing at least one image of the user.

In operation S710, the second device 2000 captures a screen image of a screen of the second device 2000. For example, the second device 2000 may capture an image of at least one of an entire screen of the second device 2000, an execution screen of a predetermined application that is executed by the second device 2000, an execution screen of predetermined content that is executed by the second device 2000, and the like. The second device 2000 may generate a still image or a moving picture image by capturing at least one screen image of the screen of the second device 2000.

In operation S720, the second device 2000 records a voice of the user of the second device 2000. For example, the second device 2000 may record the voice of the user of the second device 2000 using a microphone included in the second device 2000.

In operation S730, the second device 2000 determines an object among objects displayed on the screen of the second device 2000, which the eyes of the user of the second device 2000 are pointed at. For example, the second device 2000 may select the object from among the objects displayed on the screen of the second device 2000 that the user has viewed for a predetermined time.

In operation S740, the second device 2000 generates the use status information by combining the captured user image, the recorded voice, and the captured screen image. For example, the second device 2000 may generate a still image or a moving picture image, which includes the captured user image, the recorded voice, and the captured screen image. In some examples, the second device 2000 may include text explaining a use status of the second device 2000, in the still image or the moving picture image. The use status information may be implemented in one image but is not limited thereto. Thus, the use status information may be implemented in a user interface that includes a plurality of images.

In operation S750, the second device 2000 emphasizes an object in the captured screen image to which the eyes of the user are pointed. The second device 2000 may emphasize the object in the use status information. For example, the second device 2000 may change a color of the object to which the eyes of the user are pointed, may add a figure or a sign, and the like, which are used to indicate that the eyes of the user are pointed at the object of the captured screen image. However, one or more embodiments of the present invention are not limited thereto.

Figure 8:
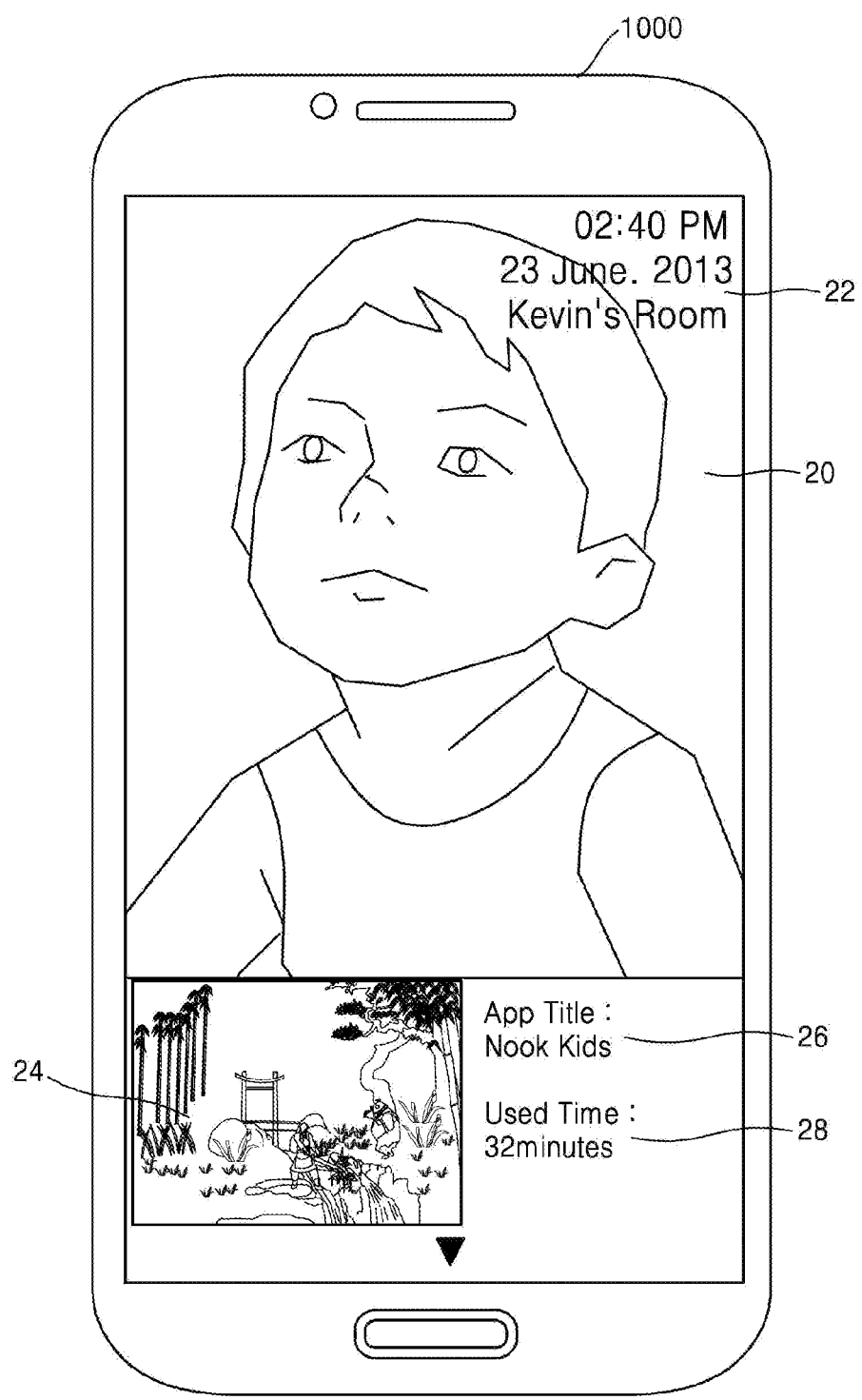
FIG. 8 illustrates an example in which use status information is displayed on a screen of the first device, according to an exemplary embodiment.

FIG. 8 illustrates an example in which use status information is displayed on a screen of the first device 1000, according to an exemplary embodiment.

The first device 1000 may receive the use status information from the second device 2000, and display the use status information on the screen of the first device 1000 as shown in FIG. 8.

For example, the first device 1000 may display a user image 20 of a user of the second device 2000 on the screen of the first device 1000, and may display text 22 indicating a time and a place at which the use status information on the user image 20 of the second device 2000 is generated.

Also, the first device 1000 may display an execution screen image 24 of content that is being executed by the second device 2000 on a screen of the first device 1000. The first device 1000 may also display a title 26 of an application that reproduces the content, and a use time 28 of the application on the screen of the first device 1000.

Figure 9:
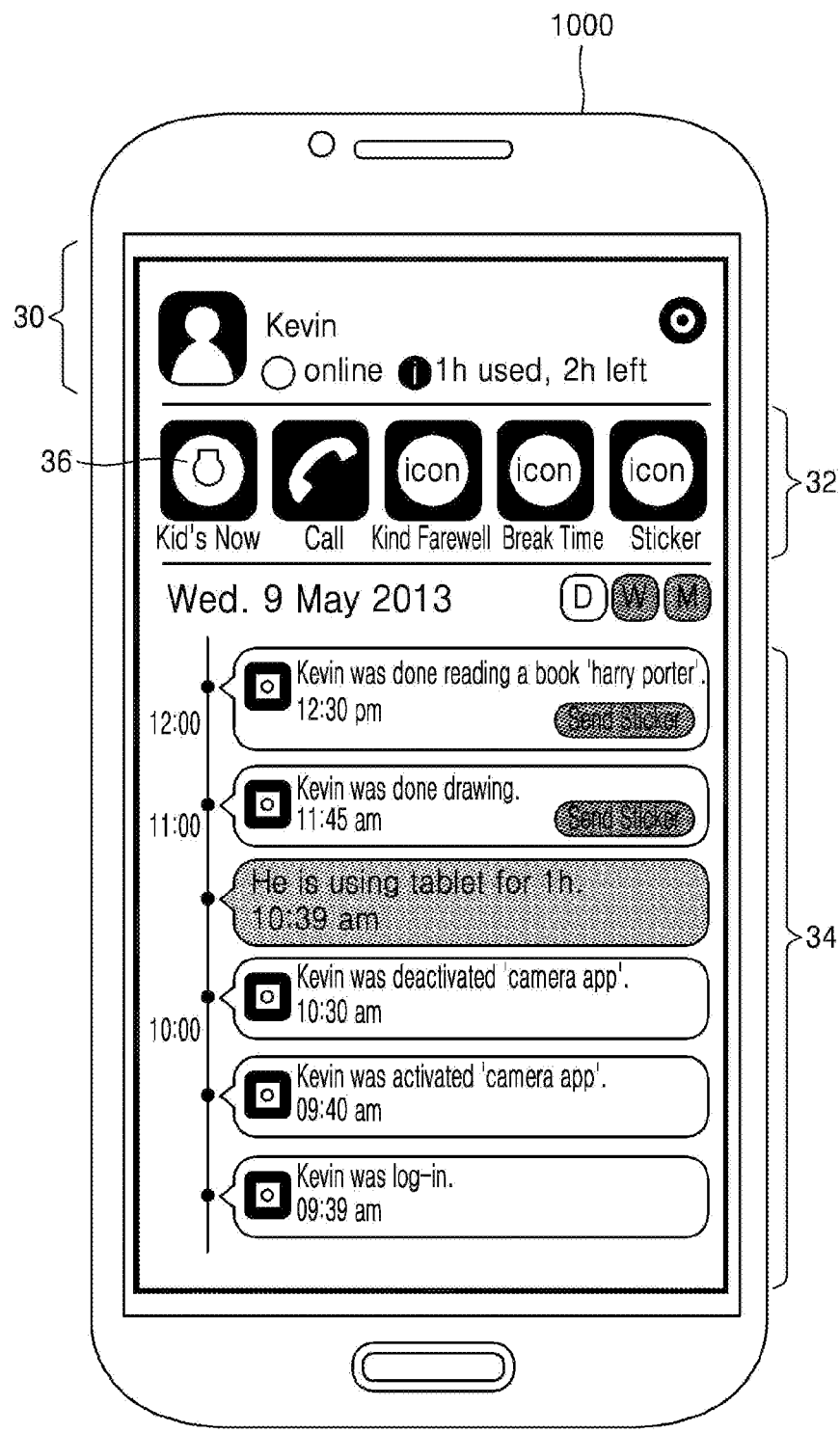
FIG. 9 illustrates an example in which use log information is displayed on a screen of the first device, according to an exemplary embodiment.

FIG. 9 illustrates an example in which use log information is displayed on a screen of the first device 1000, according to an exemplary embodiment.

Referring to FIG. 9, an execution screen of a device monitoring application may be displayed on the screen of the first device 1000. For example, the execution screen of the device monitoring application may include an area 30 for displaying user information about a user of the second device 2000, an area 32 for displaying buttons used to control the second device 2000, and an area 34 for displaying the use log information about the second device 2000. Also, the area 32 for displaying the buttons to control the second device 2000 may include a button 36 used to receive the use log information about the second device 2000.

As an example, the area 30 for displaying the user information about the user of the second device 2000 may include a name of the user of the second device 2000, text indicating whether the user is currently using the second device 2000, a use time of the second device 2000, and a remaining time from a current time to a use time limit.

When a user of the first device 1000 touches the button 36, the first device 1000 may display a list of pieces of the use log information received from the second device 2000. Also, the pieces of the use log information may be arrayed according to dates and times.

Figure 10:
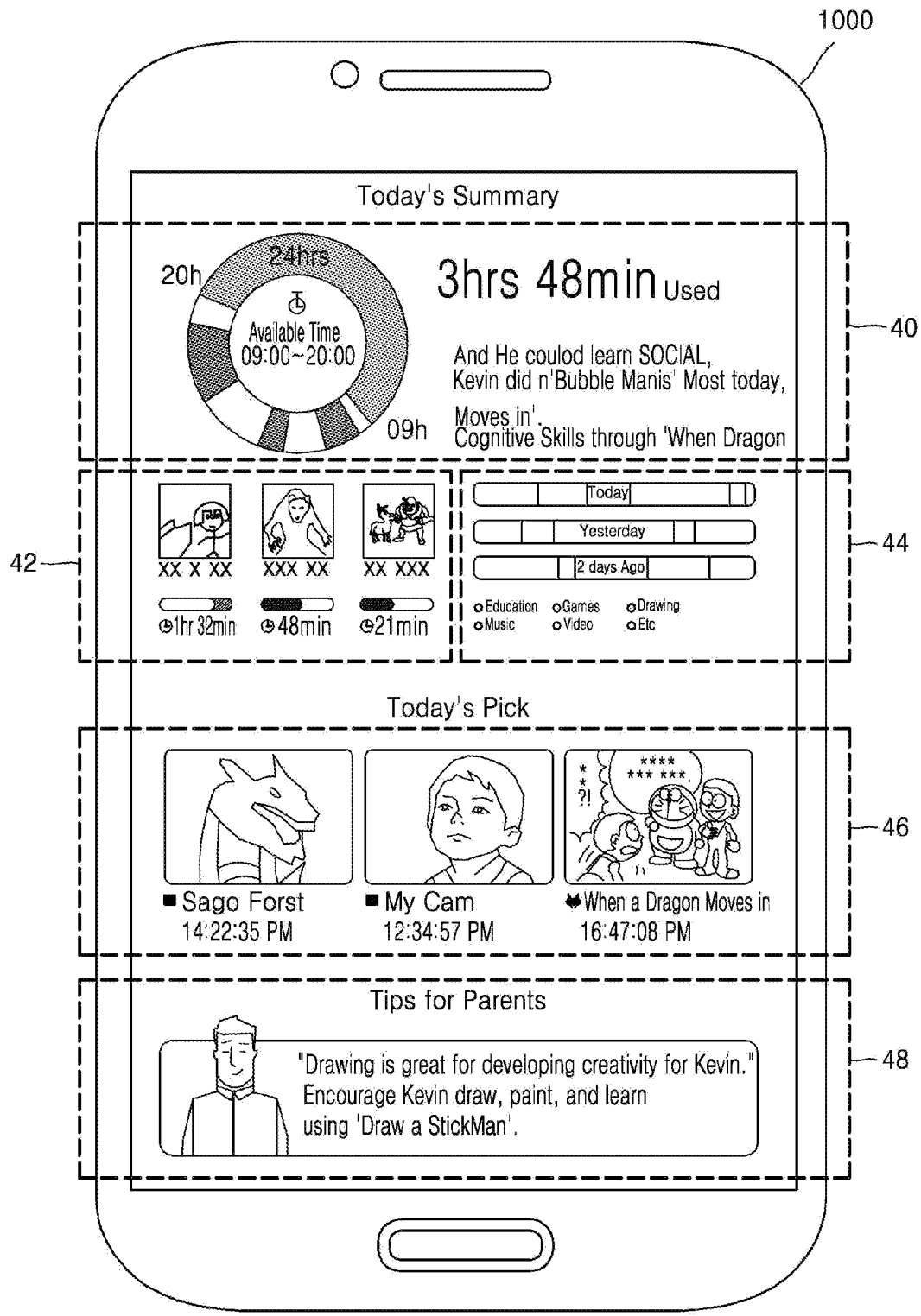
FIG. 10 illustrates an example in which use statistics information is displayed on a screen of the first device, according to an exemplary embodiment.

FIG. 10 illustrates an example in which use statistics information is displayed on a screen of the first device 1000, according to an exemplary embodiment.

Referring to FIG. 10, the use statistics information may include, but is not limited to, statistics such as information 40 about an entire use time of the second device 2000, information 42 about a use time according to each of applications, information 44 about a use time according to each category of a plurality of pieces of content reproduced by the second device 2000, and a content list 46 of a plurality of pieces of content generated by the second device 2000. The plurality of pieces of contents may include, but are not limited to, a drawing work performed by a user of the second device 2000, a photo taken by the user of the second device 2000, an image captured by the user of the second device 2000, and the like.

The use statistics information may also include expert comment information 48. For example, the second device 2000 may generate the expert comment information 48 based on a use pattern of the second device 2000, content reproduced by the second device 2000, the content generated by the second device 2000, and the like, and may add the expert comment information 48 to the use statistics information. For example, the expert comment information 48 may include a comment that may be referred to for educating the user of the second device 2000.

Figure 11:
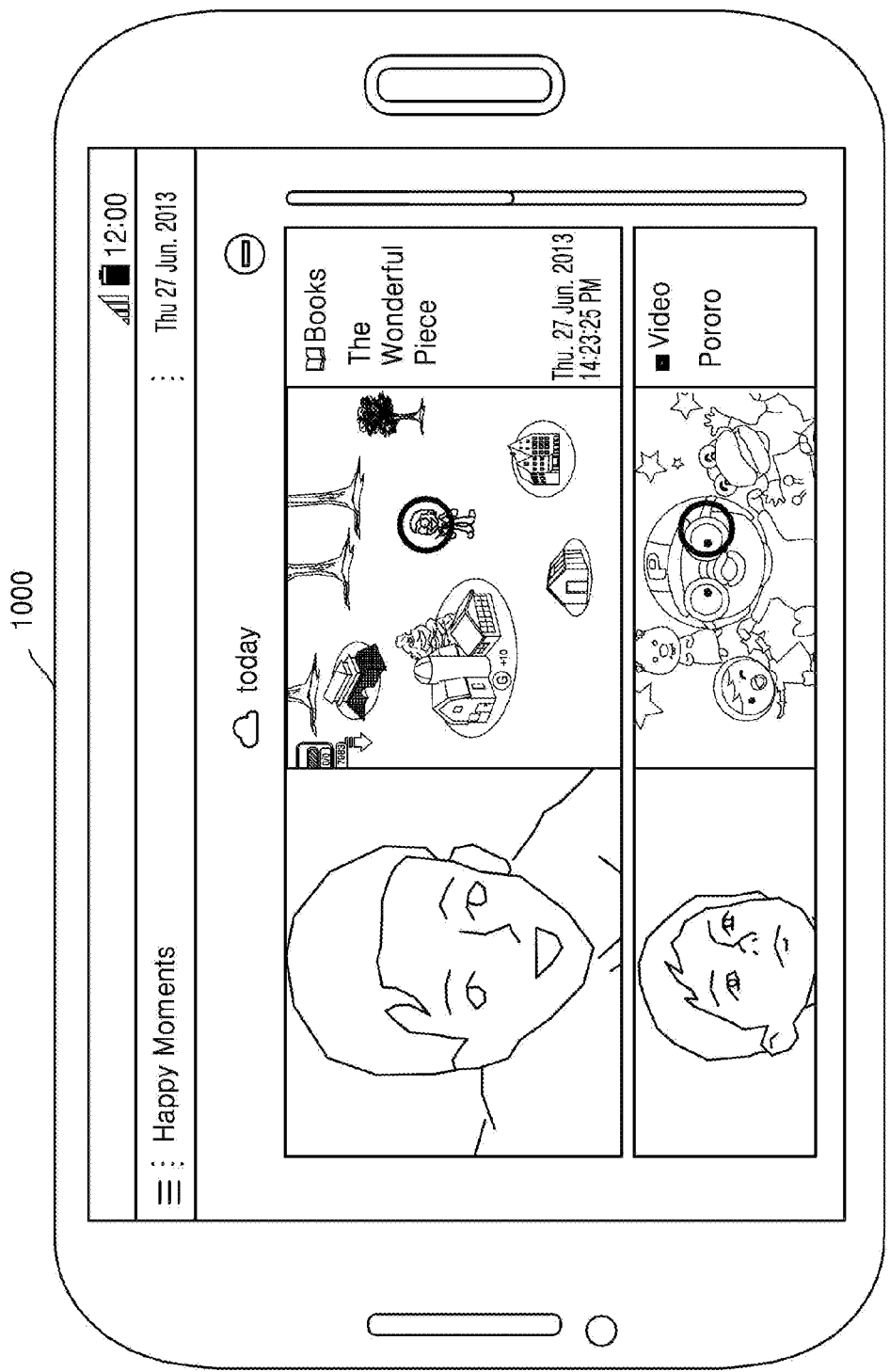
FIG. 11 illustrates an example in which use status information that was generated as a moving picture is displayed on a screen of the first device, according to an exemplary embodiment.

FIG. 11 illustrates an example in which use status information that was generated as a moving picture is displayed on a screen of the first device 1000, according to an exemplary embodiment.

Referring to FIG. 11, the moving picture includes an image of a user of the second device 2000 and content executed by the second device 2000 which are displayed on the screen of the first device 1000. In this example, when the user smiles, an object on the screen at which the user is smiling at may be emphasized. For example, the second device 2000 may determine an object to which the eyes of the smiling user of the second device 2000 are pointed at.

Figure 12:
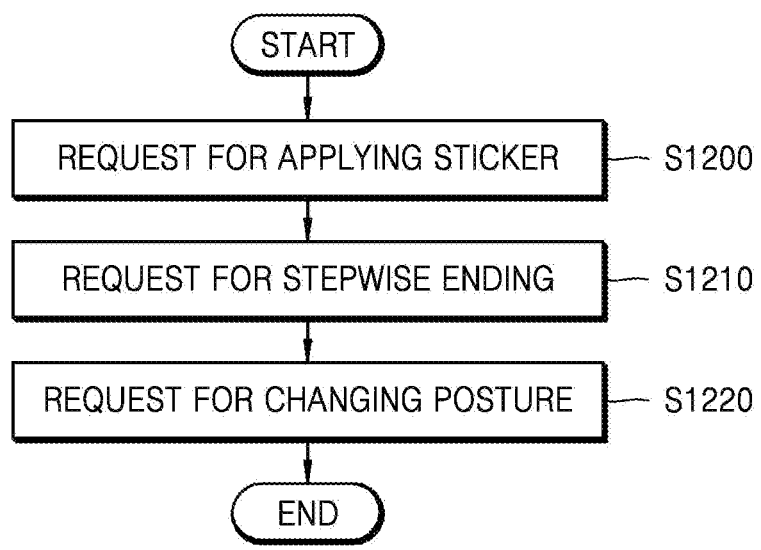
FIG. 12 is a flowchart of a method of providing control information to the second device, the method performed by the first device, according to an exemplary embodiment.

FIG. 12 is a flowchart of a method of providing control information to the second device 2000, the method performed by the first device 1000, according to an exemplary embodiment.

Referring to FIG. 12, in operation S1200, the first device 1000 requests the second device 2000 to apply a sticker to content that is generated by the second device 2000. For example, the first device 1000 may display the content generated by the second device 2000 on a screen of the first device 1000 using a device monitoring application. In response to a user input, the first device 1000 may generate control information for requesting the second device 2000 to apply a compliment sticker on a screen of the content generated by the second device 2000. Also, the first device 1000 may transmit the control information to the second device 2000.

In operation S1210, the first device 1000 may request the second device 2000 to stepwise end an application that is being executed by the second device 2000 or content that is being reproduced by the second device 2000. For example, the first device 1000 may set the number of times and a time interval that the first device 1000 recommends the second device 2000 to end the application or the content, thus creating a stepwise end to the content. The first device 1000 may generate control information for requesting the second device 2000 to output, according to the setting, a message about recommending to end the application or the content to a user of the second device 2000. The first device 1000 may transmit the control information to the second device 2000.

In operation S1220, the first device 1000 may request the second device 2000 to output a message for changing a posture of the user of the second device 2000. For example, the first device 1000 may receive information indicating that the posture of the user of the second device 2000 has been poor for a preset time period, and thus, may generate control information for requesting the second device 2000 to output the message for changing the posture of the user of the second device 2000. The first device 1000 may transmit the control information to the second device 2000.

Figure 13:
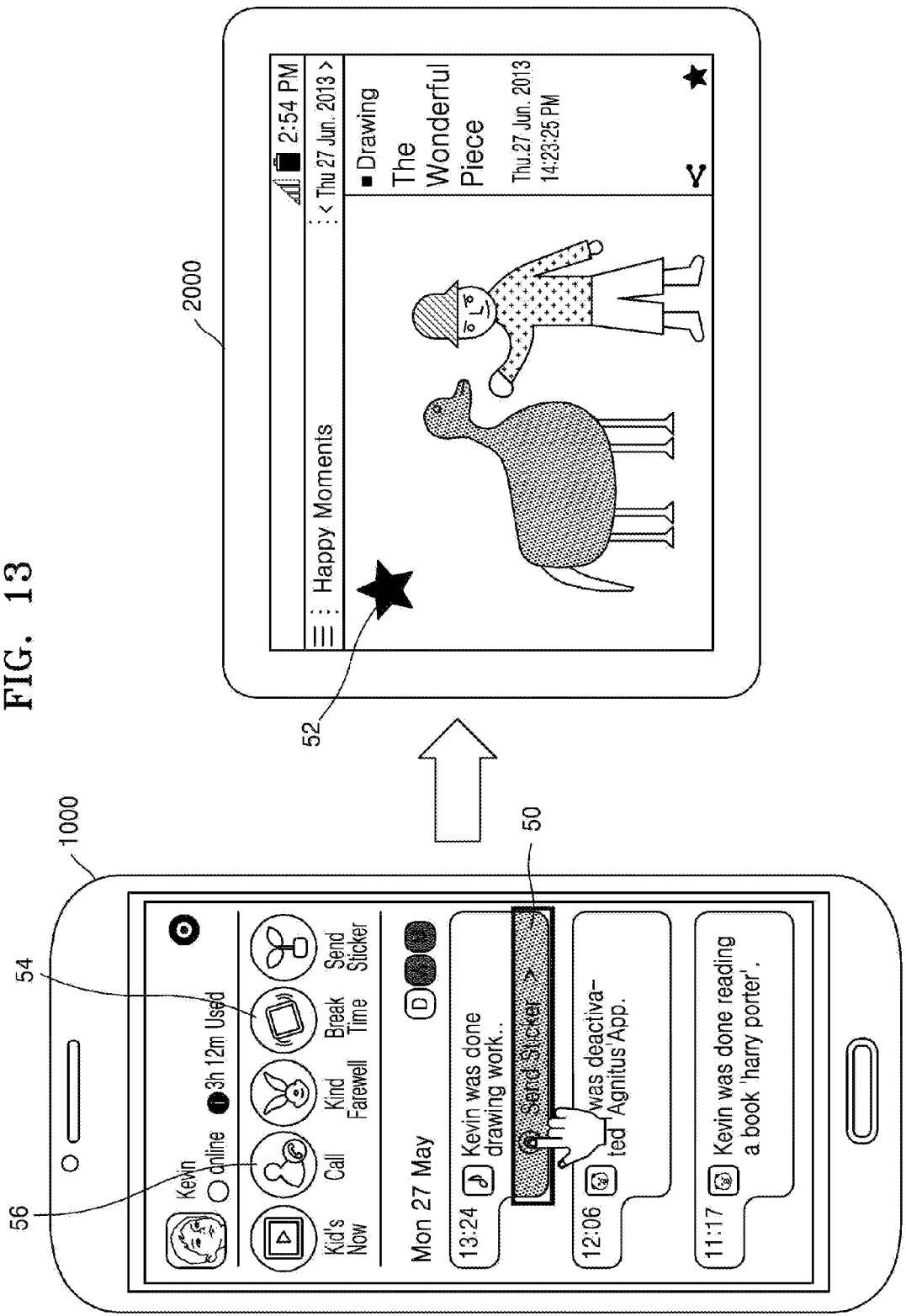
FIG. 13 illustrates an example in which the first device controls the second device via a device monitoring application that is executed in the first device, according to an exemplary embodiment.

FIG. 13 illustrates an example in which the first device 1000 controls the second device 2000 via a device monitoring application that is executed in the first device 1000, according to an exemplary embodiment.

Referring to FIG. 13, a user of the first device 1000 may touch a button 50 on a list of a plurality of pieces of use log information to send a sticker to a drawing work generated by a user of the second device 2000. The button in this example is pushed at 13:24 p.m. Accordingly, the first device 1000 may request the second device 2000 to apply the sticker to the drawing work that was performed by the user of the second device 2000 at 13:24 p.m. Then, the second device 2000 may apply a sticker 52 to the drawing work.

Also, the user of the first device 1000 may touch a button 54 on an execution screen of the device monitoring application to induce or otherwise suggest a user of the second device 2000 perform physical activity. Thus, the first device 1000 may transmit, to the second device 2000, control information for requesting the second device 2000 to perform an operation of inducing the physical activity of the user of the second device 2000. In response, the second device 2000 may stop reproducing executed content. Also, the second device 2000 may display a message notifying of a break time on a screen of the second device 2000.

The user of the first device 1000 may touch a button 56 on the execution screen of the device monitoring application to request to call the user of the second device 2000. Thus, the first device 1000 may call the second device 2000.

Figure 14:
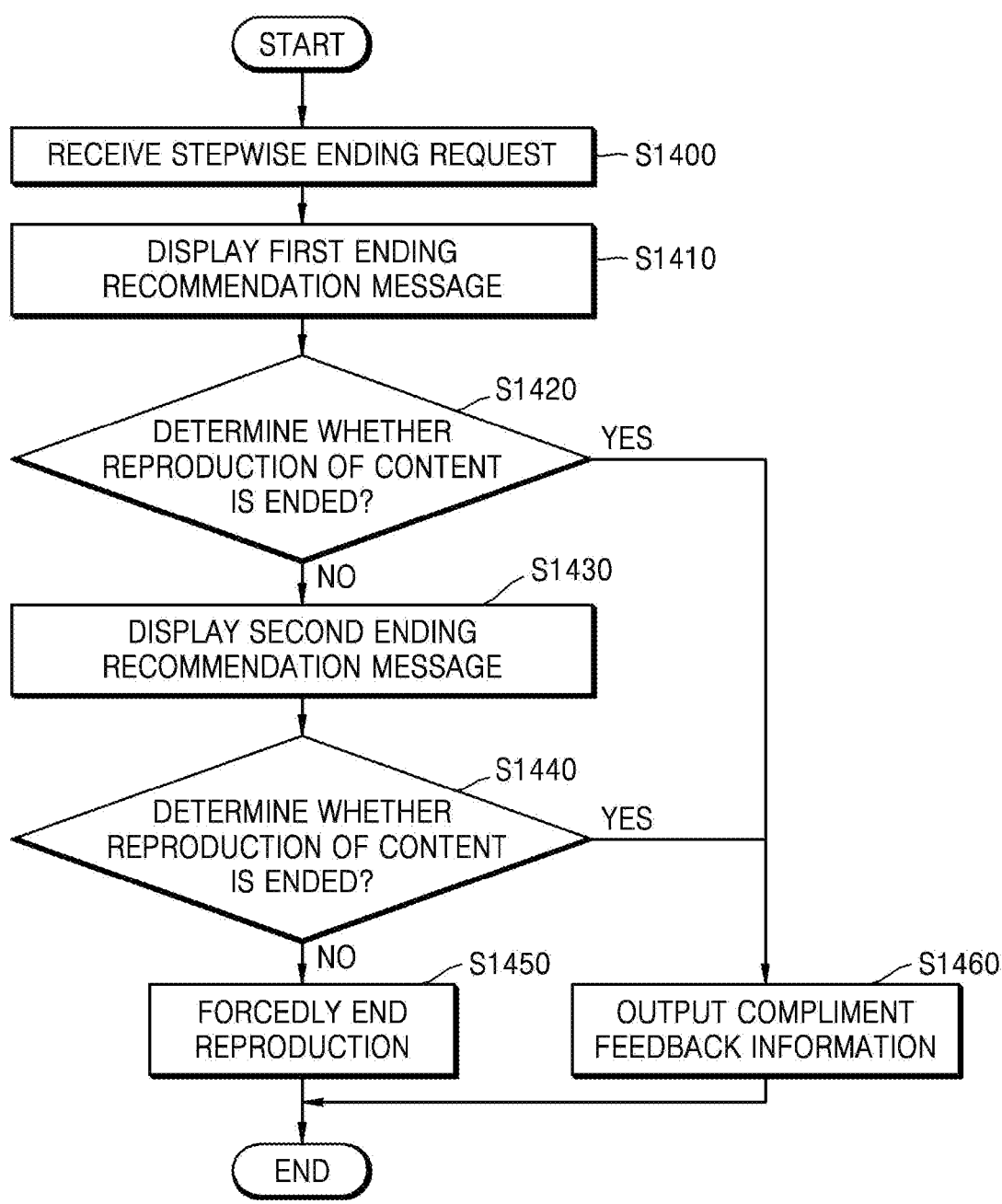
FIG. 14 is a flowchart of a method of stepwise ending content that is reproduced by the second device, in response to a request from the first device, the method performed by the second device, according to an exemplary embodiment.

FIG. 14 is a flowchart of a method of stepwise ending content that is reproduced by the second device 2000, in response to a request from the first device 1000, the method performed by the second device 2000, according to an exemplary embodiment.

Referring to FIG. 14, in operation S1400, the second device 2000 receives a stepwise ending request from the first device 1000. The first device 1000 may transmit a request to the second device 2000 to request the second device 2000 to stepwise end reproduction of content that is being executed by the second device 2000, and the second device 2000 may receive the request from the first device 1000. In this example, the first device 1000 may set the number of times and a time interval that the first device 1000 recommends that the second device 2000 end the reproduction, and may provide information about the set number of times and the set time interval to the second device 2000. Also, the first device 1000 may set a condition to start ending recommendation, and may provide information about the set condition to the second device 2000.

In operation S1410, the second device 2000 displays a first ending recommendation message on a screen of the second device 2000. According to the condition to start the ending of the reproduction, the second device 2000 may display the first ending recommendation message on the screen of the second device 2000. For example, the second device 2000 may display the first ending recommendation message on the screen of the second device 2000, within a preset time from a point of time when the second device 2000 receives the ending recommendation request from the first device 1000. Also, for example, when a current time is within a preset time period from a use time limit, the second device 2000 may display the first ending recommendation message on the screen of the second device 2000. For example, when the current time meets a preset time, the second device 2000 may display the first ending recommendation message on the screen of the second device 2000. However, one or more exemplary embodiments are not limited thereto.

The second device 2000 may display the first ending recommendation message on the screen of the second device 2000 using a character image.

In operation S1410, the second device 2000 may display the first ending recommendation message on the screen of the second device 2000, however, one or more exemplary embodiments are not limited thereto. The second device 2000 may output a voice indicating the ending recommendation first via a speaker of the second device 2000.

In operation S1420, the second device 2000 determines whether reproduction of the content has ended.

As a result of the determination in operation S1420, if the second device 2000 determines that the reproduction of the content has ended, in operation S1460, the second device 2000 outputs compliment feedback information. For example, the second device 2000 may output the compliment feedback information using a character image.

Also, as the result of the determination in operation 51420, when the second device 2000 determines that the reproduction of the content has not ended, in operation S1430, the second device 2000 may display a second ending recommendation message. For example, the second device 2000 may display the second ending recommendation message on the screen of the second device 2000, using a character image.

In operation S1430, the second device 2000 displays the second ending recommendation message on the screen of the second device 2000, but one or more exemplary embodiments are not limited thereto. For example, the second device 2000 may output a voice indicating the second ending recommendation via the speaker of the second device 2000.

In operation S1440, the second device 2000 determines whether the reproduction of the content has ended.

As a result of the determination in operation S1440, if the second device 2000 determines that the reproduction of the content is ended, in operation S1460, the second device 2000 outputs compliment feedback information. For example, the second device 2000 may output the compliment feedback information using a character image.

As the result of the determination in operation S1440, if the second device 2000 determines that the reproduction of the content has not ended, in operation S1450, the second device 2000 forcedly ends the reproduction of the content.

In the exemplary embodiment of FIG. 14, the second device 2000 ends the reproduction of the content in a stepwise manner but one or more exemplary embodiments are not limited thereto. As another example, the second device 2000 may end execution of an application in a stepwise manner, as in the exemplary embodiment of FIG. 14.

Figure 15:
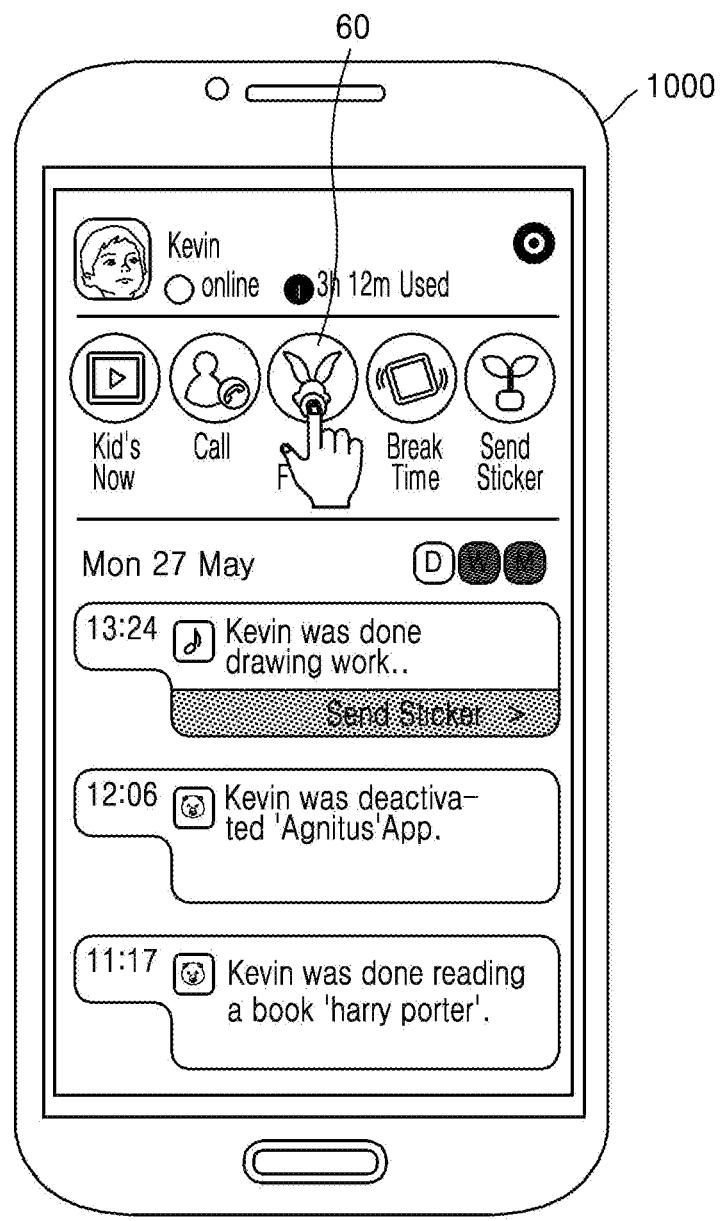
FIG. 15 illustrates an example in which the first device requests the second device to perform ending in a stepwise manner, according to an exemplary embodiment.

FIG. 15 illustrates an example in which the first device 1000 requests the second device 2000 to perform ending in a stepwise manner, according to an exemplary embodiment.

Referring to FIG. 15, a user of the first device 1000 may touch a button 60 on an execution screen of a device monitoring application to stepwise end content (or an application) that is reproduced (or executed) by the second device 2000. In this example, the first device 1000 may request the second device 2000 to stepwise end the content (or the application) that is reproduced (or executed) by the second device 2000, for example, to end the content in a predetermined amount of steps.

Figure 16A:
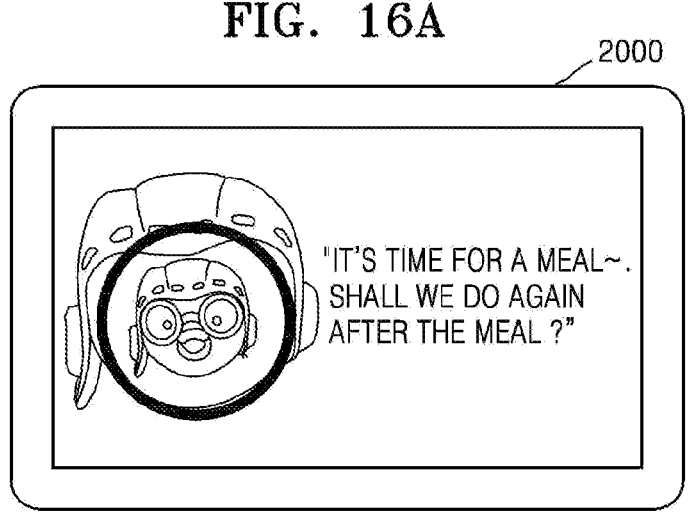
FIG. 16A-16C illustrates an example in which the second device stepwise ends content that is reproduced by the second device, according to an exemplary embodiment.
Figure 16B:
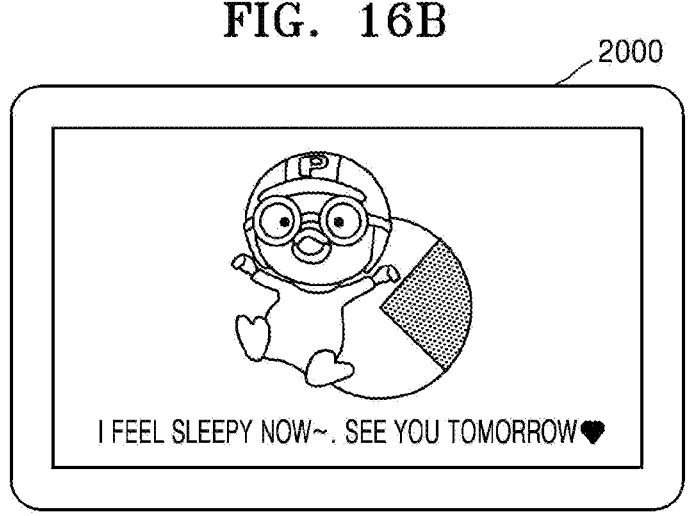
Figure 16C:
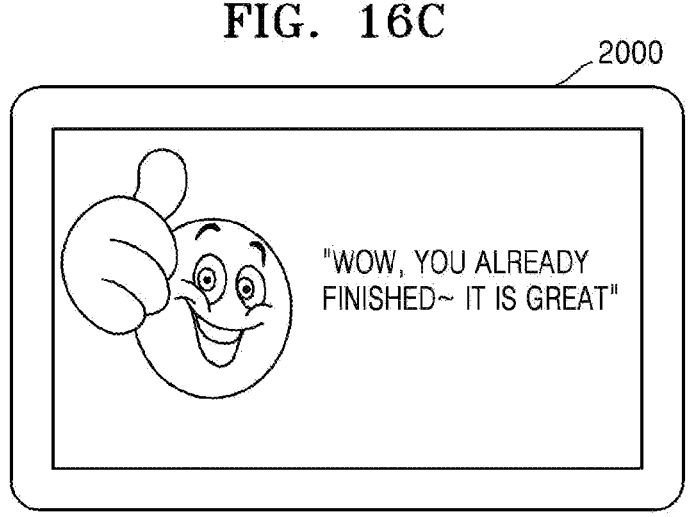

FIGS. 16A through 16C illustrate examples in which the second device 2000 stepwise ends content that is reproduced by the second device 2000, according to exemplary embodiments.

Referring to FIG. 16A, the second device 2000 may display a first ending recommendation message on a screen of the second device 2000, according to a start ending recommendation. For example, the second device 2000 may display a message "It's time for a meal~. Shall we do again after the meal?" on the screen of the second device 2000.

Referring to FIG. 16B, after the first ending recommendation message is displayed, if reproduction of the content is not ended within a predetermined time, the second device 2000 may display a second ending recommendation message on the screen of the second device 2000. For example, the second device 2000 may display a message "I feel sleepy now~. See you tomorrow" on the screen of the second device 2000.

Referring to FIG. 16C, after the first ending recommendation message is displayed, if the reproduction of the content is ended within the predetermined time, the second device 2000 may display a compliment feedback message on the screen of the second device 2000. For example, the second device 2000 may display a message "Wow, you already finished~It is great" on the screen of the second device 2000.

Figure 17:
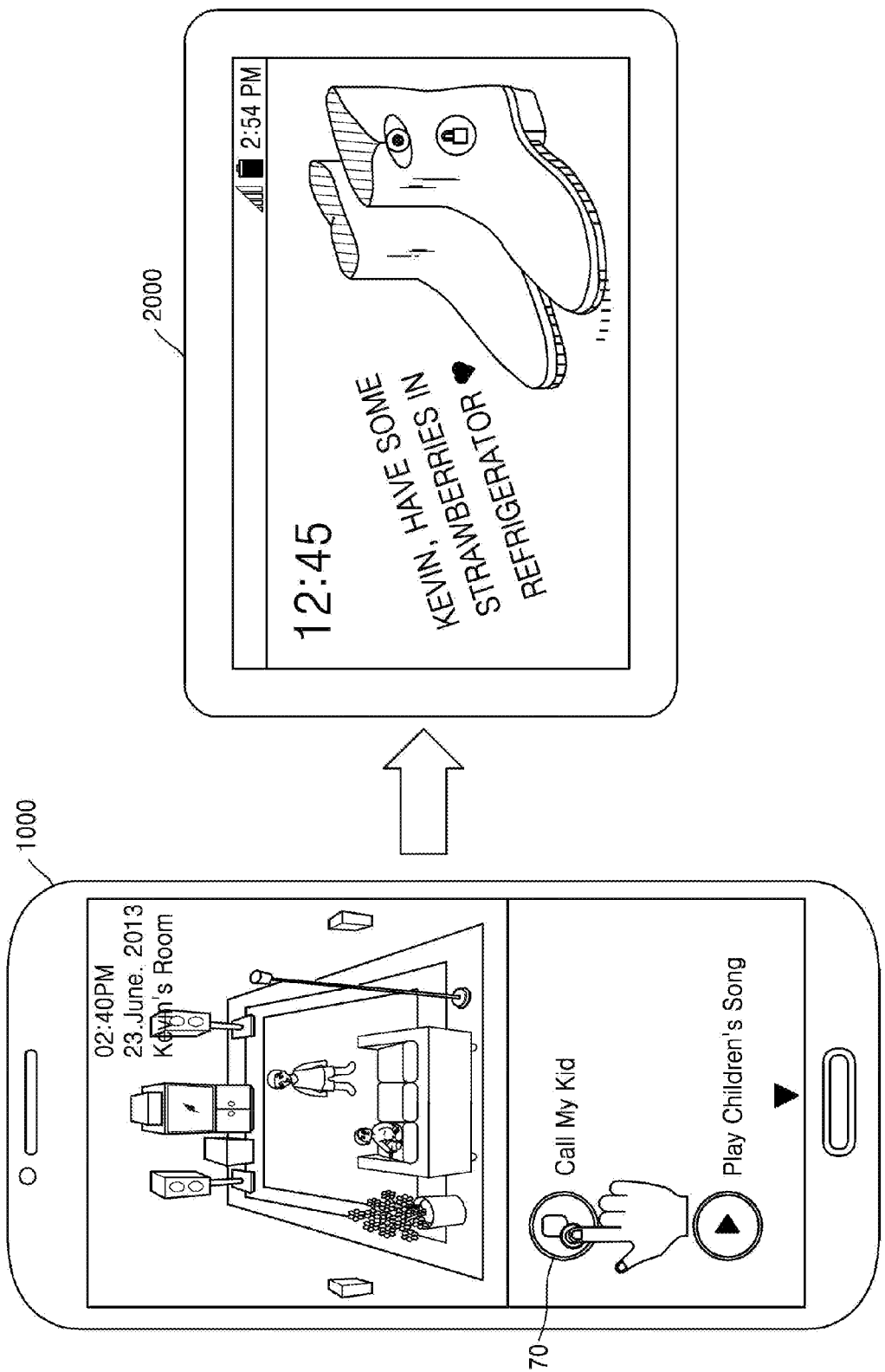
FIG. 17 illustrates an example in which the first device monitors a user of the second device via the second device, and transmits a message to the second device, according to an exemplary embodiment.

FIG. 17 illustrates an example in which the first device 1000 monitors a user of the second device 2000 via the second device 2000, and transmits a message to the second device 2000, according to an exemplary embodiment.

Referring to FIG. 17, the first device 1000 may receive a moving picture that is filmed in real-time by the second device 2000, from the second device 2000, and may reproduce the moving picture. For example, the second device 2000 may film, in real-time, surroundings around the second device 2000 while the second device 2000 is in a holder.

A user of the first device 1000 may touch a button 70 to send a voice message to a user of the second device 2000, and may input the voice message.

The second device 2000 may receive the voice message from the first device 1000, and may output the voice message. The second device 2000 may convert the voice message into text, and may display the converted text on a screen of the second device 2000. For example, the converted text may be displayed on an unlock screen of the second device 2000.

Figure 18:
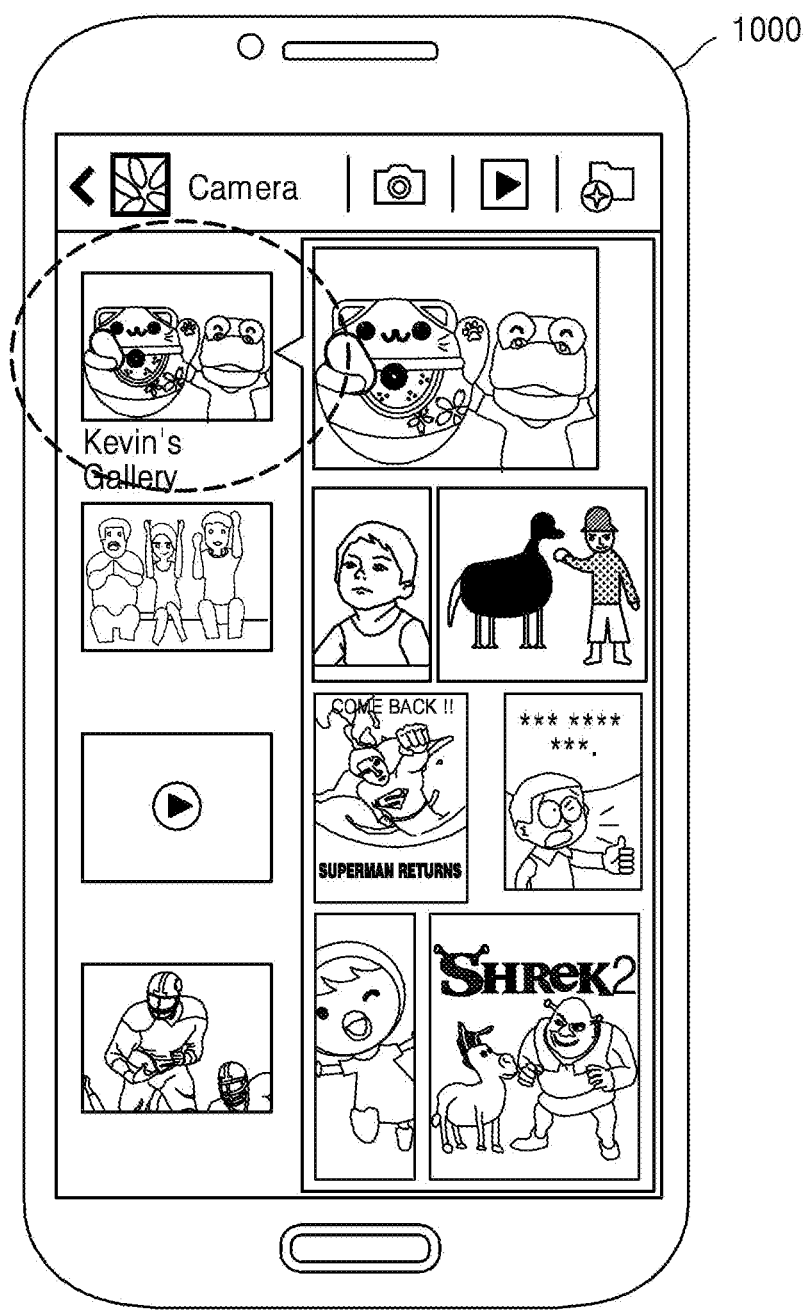
FIG. 18 illustrates an example in which content that is generated by the second device is displayed on a screen of the first device, according to an exemplary embodiment.

FIG. 18 illustrates an example in which content that is generated by the second device 2000 is displayed on a screen of the first device 1000, according to an exemplary embodiment.

Referring to FIG. 18, the first device 1000 may display the content that is generated by the second device 2000, via a gallery application that is installed in the first device 1000.

Figure 19:
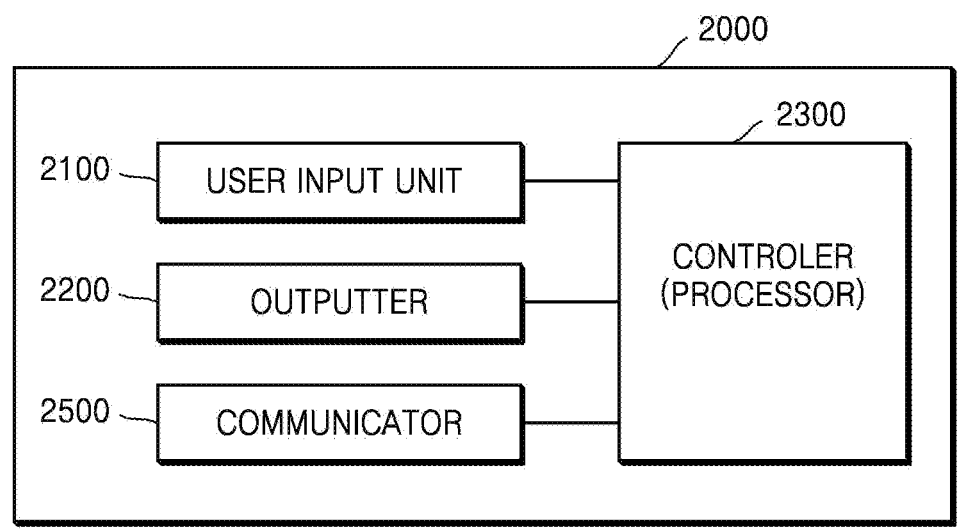
FIGS. 19 and 20 are block diagrams illustrating the second device according to exemplary embodiments.
Figure 20:
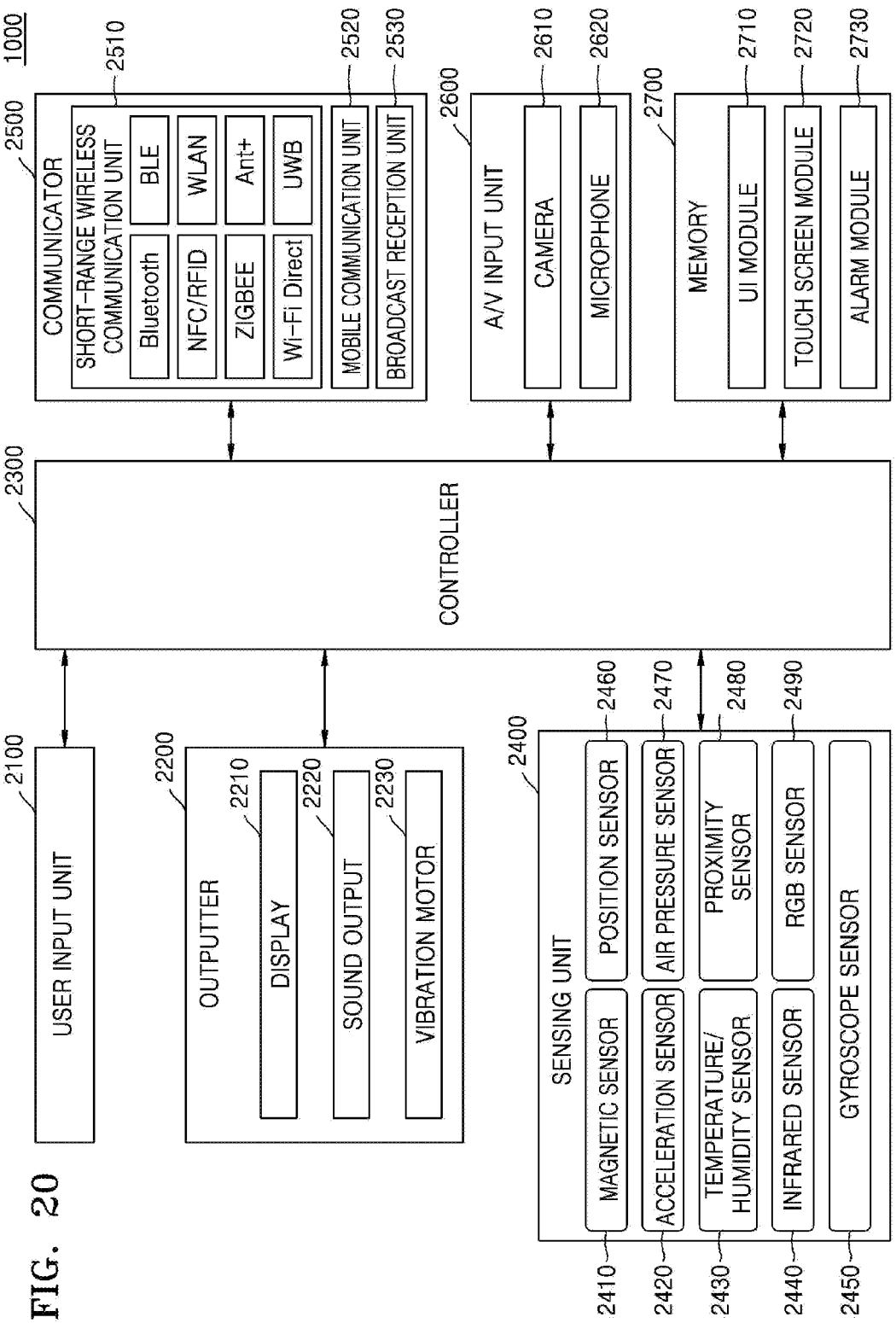

FIGS. 19 and 20 are block diagrams illustrating the second device 2000 according to exemplary embodiments.

As illustrated in FIG. 19, the second device 2000 may include a user input unit 2100, an outputter 2200, a controller 2300 (which may also be referred to as 'processor 2300'), and a communicator 2500. However, it should be appreciated that not all elements shown in FIG. 19 are necessary elements. That is, the second device 2000 may be embodied with more or less elements than the elements shown in FIG. 19. For example, as illustrated in FIG. 20, the second device 2000 may further include a sensing unit 2400, an audio/video (NV) input unit 2600, and a memory 2700, as well as the user input unit 2100, the outputter 2200, the controller 2300, and the communicator 2500.

The user input unit 2100 may be a unit by which a user inputs data to control the second device 2000. For example, the user input unit 2100 may include a key pad, a dome switch, a touch pad (such as a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, a jog switch, a speech recognition module to receive vocal commands, a camera to receive user motion input, and the like, but one or more exemplary embodiments are not limited thereto.

The user input unit 2100 may receive a user input. For example, the user input unit 2100 may receive a user input for executing an application, for reproducing content, for generating content, and the like.

The outputter 2200 may output data through an audio signal, a video signal, a vibration signal, and the like, and may include a display 2210, a sound output 2220, a vibration motor 2230, or the like.

The display 2210 is controlled by the controller 2300, and thus, displays information processed by the second device 2000. The display 2210 may display a message for inducing a physical activity of the user of the second device 2000, a message for recommending a stepwise ending of an application or content which is executed or reproduced by the second device 2000, and a message received from the first device 1000.

The display unit 2210 and a touch pad be implemented as a mutual layer structure and may form a touch screen, and the display 2210 may be used as both an output device and input device. For example, the display 2210 may include at least one of a liquid crystal display (LCD), a thin film transistor-liquid crystal display (TFT-LCD), an organic light-emitting diode display, a flexible display, a three-dimensional (3D) display, an electrophoretic display, and the like. Also, according to a type of the second device 2000, the device 100 may include at least two display units 2210. Here, the at least two display units 2210 may face each other using a hinge such as a notebook or a laptop.

The sound output 2220 may output audio data that is received from the communicator 2500 or that is stored in the memory 2700. The sound output 2220 may output the message for inducing the physical activity of the user of the second device 2000, the message for recommending stepwise ending of the application or the content which is executed or reproduced by the second device 2000, and the message received from the first device 1000, by using a voice. Also, the sound output 2220 outputs a sound signal (e.g., a call signal receiving sound, a message receiving sound, an alarm sound, and the like) related to capabilities performed by the second device 2000. The second device 2000 may include a speaker, a buzzer, and the like.

The vibration motor 2230 may output a vibration signal. For example, the vibration motor 2230 may output the vibration signal that corresponds to an output of the audio data (e.g., the call signal receiving sound, the message receiving sound, and the like) or video data.

The controller 2300 may generally control all operations of the second device 2000. For example, the controller 2300 may control the user input unit 2100, the outputter 2200, the sensing unit 2400, the communicator 2500, the A/V input unit 2600, the memory 2700, and the like, by executing programs stored in the memory 2700. Also, the controller 2300 may control the user input unit 2100, the outputter 2200, the sensing unit 2400, the communicator 2500, and the A/V input unit 2600, and thus, may control the second device 2000 to sense an occurrence of an event, to generate use information about the second device 2000, provide the use information to the first device 1000, and output a message received from the first device 1000.

For example, the controller 2300 may sense whether a preset event occurs. For example, the controller 2300 may sense whether a power of the second device 2000 is turned ON or OFF, a predetermined application is being executed or ended, or predetermined content is executed or ended. Also, the controller 2300 may sense a status of a user of the second device 2000 and may analyze a posture of the user. Also, the controller 2300 may determine whether a current time approaches a use time limit. Also, types of events to be sensed by the controller 2300 may be preset by the first device 1000.

Also, the controller 2300 may generate device use information. The controller 2300 may generate information about a use status of the second device 2000, and information about a status of the user of the second device 2000. Also, the information about the use status of the second device 2000 may include real-time use status information about the second device 2000, use log information about the second device 2000, use statistics information about the second device 2000, and the like.

For example, the device use information may include at least one of an image, a sound, and text, and may be generated in a format that can be output via the device monitoring application installed in the first device 1000.

For example, the controller 2300 may generate, in real-time, the use status information indicating the use status of the second device 2000. The controller 2300 may capture a user image of the user of the second device 2000, may capture a screen image of a screen of the second device 2000, and thus, may generate the use status information by combining the user image and the screen image. For example, when the user of the second device 2000 views content via the second device 2000, the controller 2300 may capture an image of a face of the user, and may capture an image of the content that is being reproduced on the screen of the second device 2000. The captured user image and the captured screen image may be still images but a type of the captured image is not limited thereto. As another example, the controller 2300 may encode the captured user image and the captured screen image into a moving picture.

When a predetermined event occurs, the controller 2300 may generate use status information. For example, when the controller 2300 determines that the user of the second device 2000 who views reproduced content smiles, the controller 2300 may capture an image of a face of the user, and may capture a screen of the content which is displayed when the user smiles. Also, for example, when the controller 2300 receives a request regarding real-time use status information from the first device 1000, or when a current time approaches a use time limit, the controller 2300 may encode a moving picture indicating the user of the second device 2000 and the content that is reproduced by the second device 2000. However, one or more exemplary embodiments are not limited thereto.

The controller 2300 may generate use log information. The controller 2300 may generate the use log information by accumulating and storing a plurality of pieces of the use status information. However, a method of generating the use log information is not limited thereto.

Also, the controller 2300 may generate the use log information by accumulating and storing a plurality of pieces of information about text indicating how the user of the second device 2000 has used the second device 2000, the captured user image of the user who uses the second device 2000, an application that is executed by the second device 2000, content that is reproduced by the second device 2000, and a date and time of using the content.

Also, the controller 2300 may generate use statistics information about the second device 2000. The controller 2300 may analyze the use log information and generate the use statistics information. The use statistics information may include information about an entire use time of the second device 2000, a use time according to each application, a use time according to each category of a plurality of pieces of contents reproduced by the second device 2000, a use pattern of the second device 2000, a list of content generated by the second device 2000, and the like.

Also, the controller 2300 may add expert comment information to the use statistics information. The controller 2300 may generate the expert comment information based on the use pattern of the second device 2000, the content reproduced by the second device 2000, and the content generated by the second device 2000, and may add the expert comment information to the use statistics information. For example, the expert comment information may include a comment that may be referred to for educating the user of the second device 2000.

The controller 2300 provides the device use information to the first device 1000. The controller 2300 may transmit the device use information to the first device 1000 via the network 3000. However, one or more exemplary embodiments are not limited thereto, thus, the controller 2300 may store the device use information in a server (not shown), and the first device 1000 may use the device use information stored in the server.

The controller 2300 controls the second device 2000, based on control information. The controller 2300 may interpret the control information received from the first device 100, and may control the second device 2000, based on the control information. For example, the controller 2300 may control the output unit 2200 to output a message for inducing a physical activity of the user of the second device 2000, a message for recommending stepwise ending of an application or content which is executed or reproduced by the second device 2000, and a message received from the first device 1000.

The sensing unit 2400 may sense the status of the second device 2000 or a status of surroundings around the second device 2000, and may deliver information about the sensed statuses to the controller 2300.

For example, the sensing unit 2400 may include at least one of a magnetic sensor 2410, a gravity sensor, a motion sensor, an acceleration sensor 2420, a temperature/humidity sensor 2430, an infrared sensor 2440, a gyroscope sensor 2450, a position sensor (e.g., GPS) 2460, an air pressure sensor 2470, a proximity sensor 2480, and an RGB sensor (i.e., a luminance sensor) 2490, but one or more exemplary embodiments are not limited thereto. Functions of the sensors may be intuitionally deduced by one of ordinary skill in the art by referring to names of the sensors, thus, detailed descriptions thereof are omitted here.

The communicator 2500 may include one or more elements allowing communication between the second device 2000 and the first device 1000 or between the second device 2000 and a server (not shown). For example, the communicator 2500 may include a short range communication unit 2510, a mobile communication unit 2520, and a broadcast receiving unit 2530.

The short range communication unit 2510 may include, but is not limited to, a Bluetooth communication unit, a BLE communication unit, an NFC/RFID unit, a Wi-Fi communication unit, a ZigBee communication unit, an IrDA communication unit, a WFD communication unit, a UWB communication unit, an Ant+communication unit, and the like.

The mobile communication unit 2520 exchanges a wireless signal with at least one of a base station, an external terminal, and a server on a mobile communication network. For example, the wireless signal may include various types of data according to communication of a sound call signal, a video call signal, or a text/multimedia message.

The broadcast receiving unit 2530 receives a broadcast signal and/or information related to broadcast from the outside through a broadcast channel. For example, the broadcast channel may include a satellite channel and a ground wave channel. According to an exemplary embodiment, the second device 2000 may not include the broadcast receiving unit 2530.

The communicator 2500 is controlled by the controller 2300 and thus exchanges data with the first device 1000 or a server (not shown). The communicator 2500 may directly transmit data to the first device 1000 or may transmit the data to the first device 1000 via the server. Also, the communicator 2500 may directly receive data from the first device 1000 or may receive the data from the first device 1000 via the server.

The A/V input unit 2600 may receive an input of an audio signal or a video signal and may include a camera 2610 and a microphone 2620. The camera 2610 may obtain an image frame such as a still image or a moving picture via an image sensor, for example, during a video call mode or an image-capturing mode. An image that is captured via the image sensor may be processed by the controller 2300 or a separate image processing unit (not shown).

The image frame that is processed by the camera 2610 may be stored in the memory 2700 and/or may be transmitted to an external source via the communicator 2500. Also, according to a configuration of the second device 2000, two or more cameras 2610 may be arranged.

The microphone 2620 receives an external sound signal as an input and processes the received sound signal into electrical voice data. For example, the microphone 2620 may receive a sound signal from an external device or a speaker. To remove noise that occurs while the sound signal is externally input, the microphone 2620 may use various noise removing algorithms.

The memory 2700 may store a program for processing and controlling the controller 2300, or may store a plurality of pieces of input/output data.

For example, the memory 2700 may include a storage medium of at least one type of a flash memory, a hard disk, a multimedia card type memory, a card type memory such as an SD or XD card memory, RAM, SRAM, ROM, EEPROM, PROM, a magnetic memory, a magnetic disc, and an optical disc. Also, the second device 2000 may run or access a web storage or a cloud server that performs a storage function of the memory 2700 on the Internet.

The programs stored in the memory 2700 may be classified into a plurality of modules according to their functions, for example, into a user interface (UI) module 2710, a touch screen module 2720, an alarm module 2730, and the like.

The UI module 2710 may provide a specialized UI or a graphical user interface (GUI) in connection with the second device 2000 for each application. The touch screen module 2720 may detect a user's touch gesture on a touch screen and transmit information about the touch gesture to the controller 2300. The touch screen module 2720 may recognize and analyze a touch code. The touch screen module 2720 may be configured by additional hardware including a controller.

The alarm module 2730 may generate an alarm signal for alarming of an occurrence of an event. Examples of the event that occurs in the second device 2000 may include a call signal reception, a message reception, a key signal input, schedule notification, and the like. The alarm module 2730 may output a video-format alarm signal via the display 2210, may output an audio-format alarm signal via the sound output 2220, or a vibration signal via the vibration motor 2230.

Figure 21:
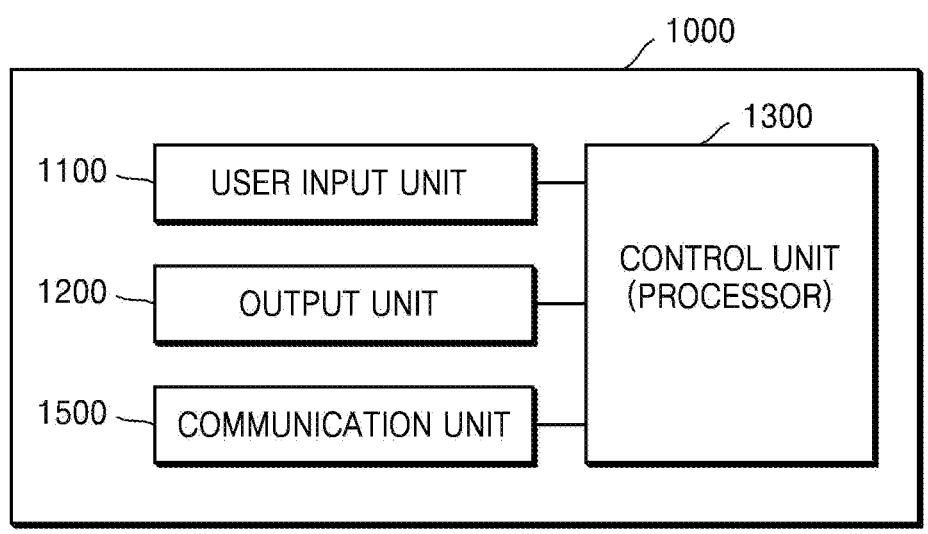
FIG. 21 is a block diagram illustrating the first device, according to an exemplary embodiment.

FIG. 21 is a block diagram of the first device 1000, according to an exemplary embodiment.

Referring to FIG. 21, the first device 1000 may include a user input unit 1100, an outputter 1200, a controller 1300 (hereinafter, also referred as 'processor 1300'), and a communicator 1500. However, not all elements shown in FIG. 21 are necessary elements of the first device 1000. For example, the first device 1000 may be embodied with more or less elements than the elements shown in FIG. 21. For example, the first device 1000 may include elements in the same technical category as that of elements of the second device 2000 as shown in FIG. 20.

The user input unit 1100 may be a unit by which a user inputs data to control the first device 1000 and the second device 2000. For example, the user input unit 1100 may include a key pad, a dome switch, a touch pad (such as a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch, a camera for capturing motion commands, a microphone for capturing vocal commands, and the like, but one or more exemplary embodiments are not limited thereto.

The user input unit 1100 may receive a user input. For example, the user input unit 1100 may receive a user input for executing a device monitoring application, a user input of displaying use information about the second device 2000, a user input for stepwise ending an application that is executed by the second device 2000 or content that is reproduced by the second device 2000, a user input of inducing a physical activity of a user of the second device 2000, and a user input of applying a sticker to content that is generated by the second device 2000.

The output unit 1200 may function to output an audio signal, a video signal, or a vibration signal and may include a display unit (not shown), a sound output unit (not shown), a vibration motor (not shown), and the like. The output unit 1200 may be controlled by the controller 1300 described below, and thus, may display an execution screen of the device monitoring application, the use information about the second device 2000, the content that is generated by the second device 2000, or the like.

The controller 1300 may generally control all operations of the first device 1000. For example, the controller 1300 may control the user input unit 1100, the output unit 1200, the communication unit 1500, and the like, by executing programs stored in a memory (not shown).

For example, the controller 1300 may set types of an event to be sensed by the second device 2000. For example, the controller 1300 may control the second device 2000 to sense whether a power of the second device 2000 is turned ON or OFF, whether a predetermined application is executed or ended, or predetermined content is executed or ended. Also, the controller 1300 may control the second device 2000 to sense a status of a user of the second device 2000 and to analyze a posture of the user. Also, for example, the controller 1300 may control the second device 2000 to determine whether a current time approaches a use time limit. Also, setting information set by the controller 1300 may be provided from the first device 1000 to the second device 2000.

The controller 1300 may display device use information about the second device 2000 which is received from the second device 2000, and may control information to be provided to the second device 2000. For example, the controller 1300 may generate control information for controlling the second device 2000 to induce physical activity of the user of the second device 2000, and control information for controlling the second device 2000 to stepwise end an application that is being executed by the second device 2000 or content that is being reproduced by the second device 2000. However, types of control information are not limited thereto.

The communicator 1500 may include one or more elements allowing communication between the first device 1000 and the second device 2000 or between the first device 1000 and a server (not shown). For example, the communication unit 1500 may include a short range communication unit (not shown), a mobile communication unit (not shown), and a broadcast receiving unit (not shown).

One or more of the exemplary embodiments of the present invention may be embodied as computer readable code/instructions stored on a non-transitory recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile media, and detachable and non-detachable media which are implemented to store information including computer readable commands, data structures, program modules, and other data. The non-transitory communication medium may include computer-readable commands, a data structure, a program module, other transmission mechanisms, and other information transmission mediums.

It should be understood that the exemplary embodiments described herein should be considered in a descriptive sense only and not for purposes of limitation. Descriptions of features or aspects within each exemplary embodiment should be considered as available for other similar features or aspects in other exemplary embodiments. For example, configuring elements that are singular forms may be executed in a distributed fashion, and also, configuring elements that are distributed may be combined and then executed.

While the present invention has been particularly shown and described with reference to the exemplary embodiments thereof, it will be understood by those of ordinary skill in the art that various changes in form and details may be made therein without departing from the spirit and scope of the present invention as defined by the following claims.

What is claimed is:

1. A method of providing device use information, the method comprising:
    monitoring a user of a device to sense a certain event;
    capturing, by the device, an image of the user of the device based on the sensed event;
    capturing, by the device, an image of a screen of the device which corresponds to the captured image of the user;
    generating, by the device, the device use information based on the captured image of the user and the captured image of the screen that corresponds to the image of the user;
    transmitting the device use information from the device to another device;
    receiving, by the device, control information transmitted from the another device in response to the transmitted device use information; and
    controlling the device based on the received control information.

2. The method of claim 1, further comprising determining, based on the captured image of the user, an object on the screen of the device at which eyes of the user are pointed, wherein the generating the device use information comprises emphasizing the determined object on the screen.

3. The method of claim 1, wherein the capturing the image of the screen comprises capturing at least one of an execution screen of an application that is executed by the device, and a reproduction screen of content that is reproduced by the device.

4. The method of claim 1, wherein a condition to generate the device use information is set by the another device, and the device use information is generated in response to the condition set by the another device being satisfied.

5. The method of claim 1, further comprising determining a status of the user based on the image of the user, wherein whether to generate the device use information is determined according to a result of the determined status of the user.

6. The method of claim 5, wherein the determining of the status of the user comprises determining a facial expression of the user.

7. The method of claim 5, wherein the determining of the status of the user comprises determining whether a shape of the user in the image of the user is different from a reference shape by a value that is equal to or greater than a preset value, based on a status of the second device which is sensed by a sensor of the second device and based on the user image.

8. The method of claim 1, wherein the generating of the device use information comprises generating real-time use status information about the device and use log information about the device.

9. The method of claim 1, wherein the generating of the device use information comprises generating use statistics information about the device.

10. The method of claim 9, wherein the generating of the use statistics information comprises adding expert comment information for educating the user of the device to the use statistics information.

11. The method of claim 1, further comprising:
receiving, from the another device, a stepwise ending recommendation request for an application or content, the request comprising a number of times that an ending recommendation is performed by the device; and
in response to the stepwise ending recommendation request, sequentially displaying a plurality of ending recommendation messages according to the number of times that the ending recommendation is performed, and according to whether the application or content being executed by the device is ended by the user of the device.

12. A device configured to provide device use information, the device comprising:
a controller configured to monitor a user of the device to sense a certain event, capture an image of the user of the device based on the sensed event, capture an image of a screen of the device which corresponds to the captured image of the user, and generate the device use information based on the captured image of the user and the captured image of the screen that corresponds to the image of the user; and
a communicator configured to transmit the device use information to another device, and receive control information transmitted from the another device in response to the device use information,
wherein the controller is further configured to control the device based on the control information received by the communicator.

13. The device of claim 12, wherein the controller is configured to determine, based on the image of the user, an object on the screen of the device at which eyes of the user are pointed, and emphasize the determined object on the screen.

14. The device of claim 12, wherein the controller is configured to capture at least one of an execution screen of an application that is being executed by the device, and a reproduction screen of content that is being reproduced by the device.

15. The device of claim 12, wherein a condition to generate the device use information is set by the another device, and the controller is configured to generate the device use information in response to the condition set by the another device being satisfied.

16. The device of claim 12, wherein the controller is configured to determine a status of the user based on the image of the user, and determine whether to generate the device use information according to a result of the determined status of the user.

17. The device of claim 16, wherein the controller is configured to determine a facial expression of the user.

18. The device of claim 16, wherein the controller is configured to determine whether a shape of the user in the image of the user is different from a reference shape by a value that is equal to or greater than a preset value, based on a status of the device which is sensed by a sensor of the device and based on the user image.

19. The device of claim 12, wherein the controller is configured to generate real-time use status information about the device and use log information about the device.

20. The device of claim 12, wherein the controller is configured to generate use statistics information about the device.

21. The device of claim 20, wherein the controller is configured to add expert comment information for educating the user of the device to the use statistics information.

22. The device of claim 12, wherein the communicator is configured to receive, from the other device, a stepwise ending recommendation request for an application or content, the request comprising a number of times that an ending recommendation is performed, and
in response to the stepwise ending recommendation request, the controller is configured to sequentially display a plurality of ending recommendation messages according to the number of times that the ending recommendation is performed, and according to whether the application or content being executed by the device is ended by the user of the device.

23. A non-transitory computer-readable medium having recorded thereon a computer program that is executable by a computer to perform the method of claim 1.

24. The method of claim 1, wherein the received control information comprises control information for ending an application executed by the device or content generated by the device, or control information for controlling a message from the another device to the device.

25. The method of claim 1, further comprising:
recording a voice of the user;
wherein the generating, by the device, the device use information further comprises generating the device use information based on the captured image of the user, the captured image of the screen that corresponds to the image of the user, and the recorded voice of the user.

* * * * *